United States Patent
Nikitin et al.

(10) Patent No.: US 6,678,125 B2
(45) Date of Patent: Jan. 13, 2004

(54) ENHANCEMENT OF MAGNETIZATION SWITCHING SPEED IN SOFT FERROMAGNETIC FILMS THROUGH CONTROL OF EDGE STRESS ANISOTROPY

(75) Inventors: Vladimir Nikitin, Campbell, CA (US); Jeffrey Gregory McCord, San Jose, CA (US); Murali Ramasubramanian, San Jose, CA (US)

(73) Assignee: International Business Machines Corporation, Armonk, NY (US)

( * ) Notice: Subject to any disclaimer, the term of this patent is extended or adjusted under 35 U.S.C. 154(b) by 79 days.

(21) Appl. No.: 10/044,513

(22) Filed: Jan. 11, 2002

(65) Prior Publication Data

US 2003/0133231 A1 Jul. 17, 2003

(51) Int. Cl.[7] .............................. G11B 5/31; G11B 5/39
(52) U.S. Cl. ........................................ 360/317; 360/126
(58) Field of Search ................................. 360/125, 126, 360/317

(56) References Cited

U.S. PATENT DOCUMENTS

| | | | | |
|---|---|---|---|---|
| 4,626,947 A | * | 12/1986 | Narishige et al. | 360/126 |
| 4,944,805 A | | 7/1990 | Nakanishi | 148/108 |
| 5,032,945 A | * | 7/1991 | Argyle et al. | 360/126 |
| 5,792,547 A | * | 8/1998 | Liu et al. | 428/212 |
| 5,849,386 A | | 12/1998 | Lal et al. | 428/65.3 |
| 6,017,605 A | | 1/2000 | Yamazaki et al. | 428/65.3 |

* cited by examiner

Primary Examiner—David L. Ometz
(74) Attorney, Agent, or Firm—Walter W. Duft

(57) ABSTRACT

A method for fabricating a soft ferromagnetic film structure with reduced edge stress anisotropy and enhanced magnetization switching speed. A soft ferromagnetic film structure is formed over an underlying structure. The soft ferromagnetic film structure has one or more edges exhibiting edge stress anisotropy. A non-ferromagnetic film structure is formed along the one or more edges to induce stress contributions therein that control the edge stress anisotropy.

20 Claims, 31 Drawing Sheets

ENHANCEMENT OF MAGNETIZATION SWITCHING SPEED IN SOFT FERROMAGNETIC FILMS THROUGH CONTROL OF EDGE STRESS ANISOTROPY

BACKGROUND OF THE INVENTION

1. Field of the Invention

The present invention relates to soft ferromagnetic films and to fabrication processes for manufacturing such films.

2. Description of the Prior Art

By way of background, soft ferromagnetic films are used for a variety of applications where film magnetization switching speed determines device performance. Examples include thin film inductors for RF and microwave circuits, magnetic random access memory arrays (MRAM), and magnetic recording. With respect to the latter category, the issue of fast magnetic switching speed becomes critical in designing write heads capable of operating at high data rates. In particular, the data writing process is enabled by guiding magnetic flux in the yoke portion of the write head to the pole tips of the head. The speed at which the magnetization direction of the pole tips can be reversed sets the limit for the speed of magnetic recording.

FIGS. 1 and 2 illustrate the geometry of a conventional integrated read/write head. The head includes a pair of soft ferromagnetic film layers P1 and P2 that extend from a back gap area BG to an ABS (Air Bearing Surface). There, the P1 and P2 layers respectively form pole tips PT1 and PT2. The pole tips are separated by an insulative gap layer G3 that defines the head's write gap. An electromagnetic coil structure C is sandwiched between the P1 and P2 layers to define the yoke portion of the head. The yoke extends from the back gap BG to the pole tips PT1 and PT2. Insulative layers I1, I2 and I3 electrically insulate the coil structure C from the P1 and P2 layers. The read portion of the read/write head of FIGS. 1 and 2 lies between a pair of shield layers S1 and S2. Note that the S2 layer is the same layer that forms the P1 layer. This is known as a "merged" design. The S2 and P1 layers can also be formed separately in what is known as a "piggyback" configuration. Located between the S1 and S2 layers is a pair of insulative G1 and G2 gap layers. A read sensor S is located between the G1 and G2 layers at the ABS.

The coil C is electrically driven by a pair of electrical leads E1 and E2. During write operations, electrical current passing through the coil generates a magnetic field that induces a magnetic flux in the P1 and P2 layers. As shown in FIG. 3, this magnetic flux propagates from the yoke to the pole tips PT1 and PT2, where it fringes across the G3 gap layer. This will cause a magnetic domain to be formed on an underlying magnetic recording medium. The orientation of the recorded magnetic domain is dependent on the magnetization direction of the pole tips PT1 and PT2, which in turn is determined by the direction of the electrical current passing through the coil C. Reversing the coil's electrical current reverses the magnetization direction of the pole tips PT1 and PT2, and consequently reverses the orientation of the next recorded magnetic domain. This magnetization reversal process is used to encode binary data on the recording medium.

Extensive studies have shown that flux propagation and magnetization reversal in a soft ferromagnetic film are greatly influenced by the intrinsic magnetic properties of the film. More specifically, it is known that to achieve fast magnetic flux propagation and magnetization reversal, the magnetic domains in the film must be aligned such that the domain walls (representing the easy axis of magnetization) are perpendicular to the direction of magnetic flux propagation. In a magnetic write head application, this means that the easy axis must be parallel to the ABS. Head manufacturers strive to create this desirable orientation of magnetic domains by applying a large magnetic field (e.g., about 1500 Oe (Oersteds)) during the formation of the P1 and P2 film layers. The applied field is shown in FIG. 4 by way of reference letter "H." The direction of the H field is parallel to the ABS and away from the reader. In theory, when the P1 and P2 layers are formed, their magnetic domains should be aligned in the direction of the H field, which sets the easy axis of the PT1 and PT2 pole tips.

Even though the desired properties of soft ferromagnetic films are known, achieving them given existing constraints on saturation moment, permeability, ability to mass manufacture, and other factors, is difficult in practice. Applicants have observed that one of the limiting factors on fast magnetic switching speed is mechanical stress in the film in combination with high magnetostriction. Even though the stress distribution in a full film may be isotropic, when the film is patterned during fabrication, the stress distribution in the area near the edges of the patterned structure tends to become anisotropic. If the film has high positive or negative magnetostriction, the anisotropic stress distribution translates to magnetic anisotropy depending on whether the film's intrinsic stress is tensile or compressive. In particular, Applicant's have observed that undesirable magnetic anisotropy develops under the following conditions: (1) positive magnetostriction coupled with intrinsic tensile stress, and (2) negative magnetostriction coupled with intrinsic compressive stress. Patterning under these conditions causes the magnetic domains to realign the film's easy axis in a direction that, for practical cases, tends to be generally parallel to the direction of flux propagation. When a patterned soft ferromagnetic film has high aspect ratio (area to perimeter), as is the case in the pole tips of a write head yoke designed for magnetic recording, this effect becomes dominant.

FIGS. 5(a) and 5(b) illustrate this phenomenon relative to a P1 or P2 yoke/pole tip structure. FIG. 5(a) shows the soft ferromagnetic film prior to patterning. The film's easy axis is shown by the double-headed arrow. Assume that the arrow is aligned parallel to the direction of the ABS to be subsequently formed. FIG. 5(b) shows the same film after patterning to create the yoke/pole tip structure. The single-headed arrows show the orientation of the magnetic domains, and thus represent the easy axis direction at various locations in the structure. Note that the edge stress anisotropy has changed the easy axis direction parallel to the edges. In the pole tip portion of the structure, the easy axis is predominantly perpendicular to the ABS.

Most soft ferromagnetic films used for magnetic write head yoke structures are electroplated. This process tends to produce tensile stress in the full film. Patterning of such films typically results in the formation of 2–10 um wide regions with high stress anisotropy near the edges. This is due to the fact that an edge cannot react tensile forces perpendicularly thereto, such that there is stress relief in that direction in the immediate vicinity of the edge. On the other hand, tensile forces parallel to the edge can be reacted, and there will be no stress relief in that direction. A positive stress anisotropy condition thus develops.

FIG. 6(a) shows a simulated stress distribution for a soft ferromagnetic film formed using a conventional electroplating process, followed by patterning. The x axis shows distance from the center of the film (x=0) measured in microns (μm). The y axis shows stress anisotropy measured in Mega-Pascals (MPa). The stress anisotropy represents the maximum stress differential along two mutually orthogonal directions in the film. A stress anisotropy value of zero signifies that the stress level is the same in all directions. A positive stress anisotropy value means that the stress differential is positive. A negative stress anisotropy value means that the stress differential is negative. FIG. 6(a) shows that there is zero stress anisotropy throughout the central region of the patterned film. The positive stress anisotropy on each side of the graph of FIG. 6(a) represents a positive stress differential at the edges of the patterned film due to the tensile stress relief condition discussed above.

When the stress distribution shown in FIG. 6(a) is combined with positive magnetostriction of the patterned film, the magnetic anisotropy distribution of FIG. 6(b) results. In FIG. 6(b), the x axis shows distance from the center of the film (x=0) measured in microns (μm). The y axis shows the anisotropy field Hk measured in Oersteds. As is well known, the anisotropy field Hk represents the amount of applied magnetic field required to shift the magnetic moment associated with the magnetic domains of a ferromagnetic material 90 degrees from the easy axis orientation. If the magnetic anisotropy value of a film is zero, it has no easy axis. Positive and negative values signify the existence of an easy axis having some given direction.

In FIG. 6(b), sign of the magnetic anisotropy changes when moving to the patterned edge of the film. This indicates that the easy axis has shifted from its initial orientation. In practice, this effect can be observed by examining the domain structures in patterned electroplated films using Kerr domain imaging. Examining the practical geometry of a magnetic write head yoke, one can be convinced that this phenomenon is leading to the magnetic domain structures shown in FIG. 5(b), which results in slow magnetic switching.

An improved soft ferromagnetic film fabrication method is required if improvements in the magnetization switching speed are to be realized for magnetic write head yokes and other devices. What is needed is a new fabrication method wherein edge stress anisotropy and consequent easy axis magnetization misalignments are avoided.

SUMMARY OF THE INVENTION

The foregoing problems are solved and an advance in the art is obtained by a novel method for fabricating a soft ferromagnetic film structure with controlled edge stress anisotropy and enhanced magnetization switching speed. According to the method, a soft ferromagnetic film structure is formed over an underlying structure. The soft ferromagnetic film structure has one or more edges exhibiting edge stress anisotropy. A non-ferromagnetic film structure is formed along the one or more edges of the soft ferromagnetic film structure to induce stress contributions therein. This modifies the edge stress anisotropy in the patterned film by either eliminating it or changing its sign to align the magnetic anisotropy in a preferred way by inducing stress contributions higher than those which are present in the patterned film prior to application of the non-ferromagnetic film. The stress contributions can be supplied by the initial stress anisotropy of the non-ferromagnetic film as deposited, and can additionally be supplied by stress changes during processing steps such as higher temperature annealing.

In embodiments of the invention directed to magnetic write heads, the soft ferromagnetic film structure includes a transition metal alloy, such as a material from the group consisting of alloys of nickel-iron (permalloy), nickel-iron-cobalt alloys, Sendust and cobalt-rare earth alloys. The non-ferromagnetic film structure is made from a material that is sufficiently stiff to react the edge stress anisotropy away from the edges of the soft ferromagnetic film structure or even reverse the edge stress anisotropy along such edges. In can be a non-ferromagnetic metal or a non-metallic electrical insulator material.

The soft ferromagnetic film structure and the non-ferromagnetic film structure can be formed using an electroplating process, a vacuum deposition process, or a combination of both. If an electroplating process is used, the non-ferromagnetic film structure will comprise a non-ferromagnetic metal capable of being electroplated, such as a material from the group consisting of palladium, copper and nickel-phosphorus alloy. If the non-ferromagnetic film structure is deposited, it may either be a metal or a non-metal, such as a material from the group consisting of $Al_2O_3$ and $SiO_2$.

In preferred applications, the soft ferromagnetic film structure is formed as a magnetic write head yoke/pole tip structure of an integrated read/write transducer. The invention further contemplates a disk drive that contains a magnetic write head component made in accordance with the inventive process. The invention may also be used to produce MRAM devices and thin film inductors for RF and microwave circuits.

BRIEF DESCRIPTION OF THE DRAWING

The foregoing and other features and advantages of the invention will be apparent from the following more particular description of preferred embodiments of the invention, as illustrated in the accompanying Drawing, in which.

DETAILED DESCRIPTION OF PREFERRED EMBODIMENTS

1. Introduction

Figure 7A:
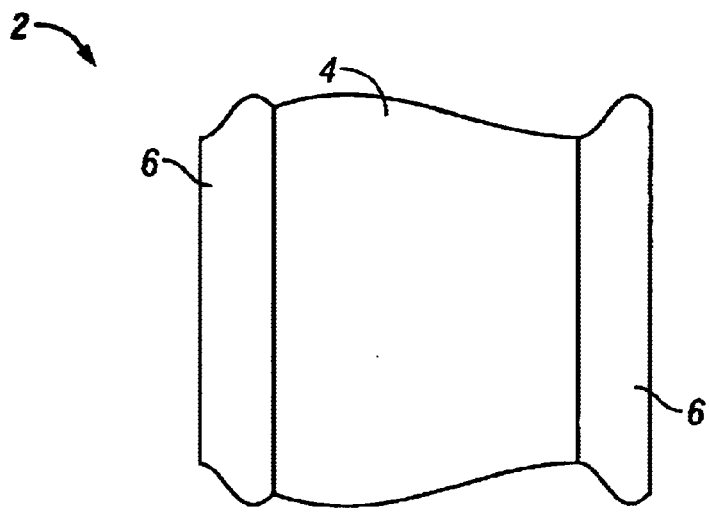
FIG. 7(a) is a plan view of a generalized patterned soft ferromagnetic film made in accordance with the invention and useable for a variety of applications, such as MRAM devices; thin film inductors for RF and microwave circuits, and magnetic write heads.
Figure 7B:
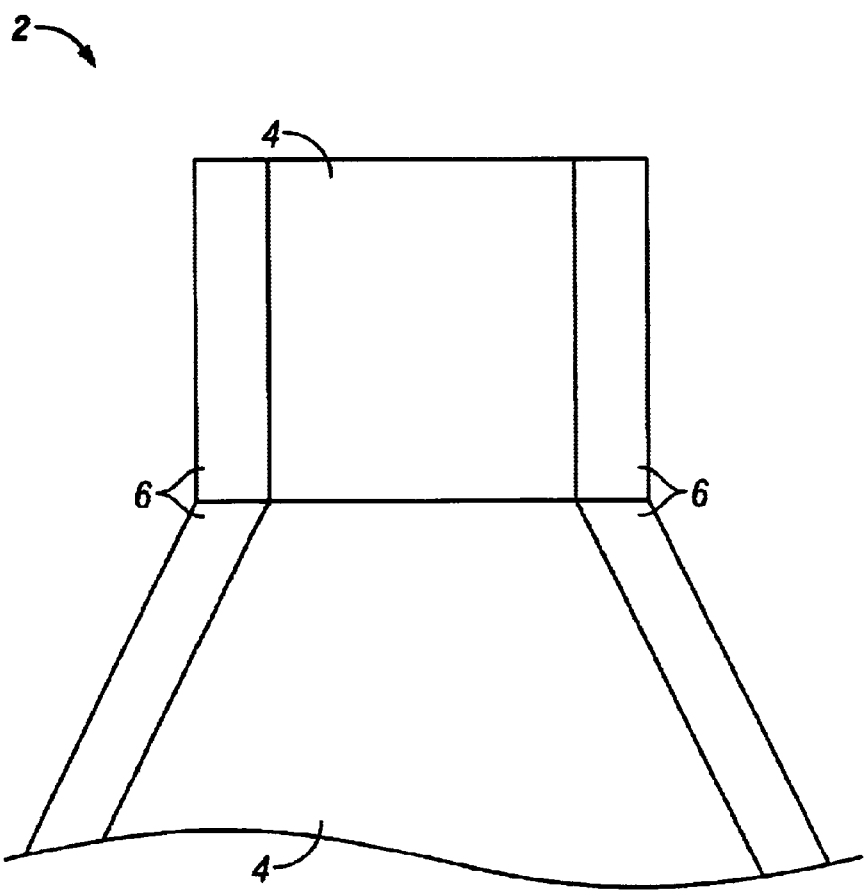
FIG. 7(b) is a plan view of a specialized patterned soft ferromagnetic film made in accordance with the invention and adapted for magnetic write head yoke structures.

Turning now to the figures, wherein like reference numerals represent like elements in all of the several views, FIGS. 7(a) and 7(b) illustrate magnetic structures 2 that are constructed in accordance with the invention. FIG. 7(a) is a generalized structure that could be configured for a variety of applications, such as MRAM devices; thin film inductors for RF and microwave circuits, and magnetic write heads. FIG. 7(b) is a specialized structure that is configured for use as a yoke/pole tip structure for magnetic write applications. The magnetic structures 2 comprise a patterned soft ferromagnetic film 4 whose magnetization switching speed has been increased through engineered control of the film's magnetic domains. Generally speaking, this result is achieved by controlling the stress anisotropy at the edges of the patterned film 4. The preferred way to do this is to extend the effective area of the patterned film 4 using non-ferromagnetic material 6 that may be either metallic or nonmetallic, electrically insulating or non-insulating. Using this approach, the stress effects at the edges of the patterned film 4 are altered by effectivity moving them away from the soft ferromagnetic material, and, thus, do not affect the film's magnetic anisotropy in a negative way. The non-ferromagnetic material 6 provides this result by inducing stress contributions that alter the edge stress anisotropy of the patterned film 4. The stress contributions can be supplied by the initial stress anisotropy of the non-ferromagnetic film as deposited, and can additionally be supplied by stress changes during subsequent processing steps such as higher temperature annealing.

Figure 8A:
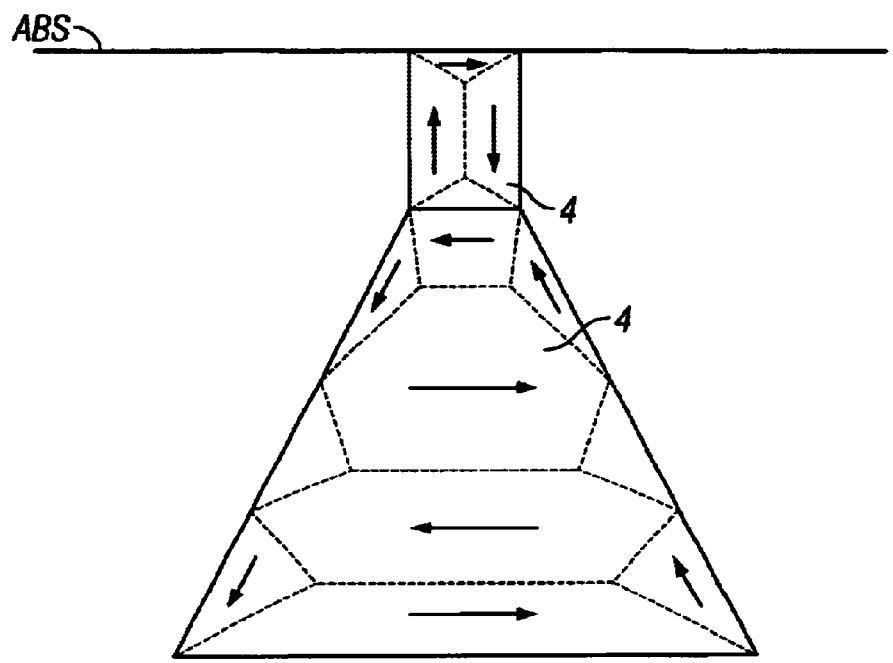
FIGS. 8(a) and 8(b) are diagrammatic plan view representations of exemplary magnetic domains that may be formed in the patterned ferromagnetic film of FIG. 7(b) in accordance with the invention.
Figure 8B:
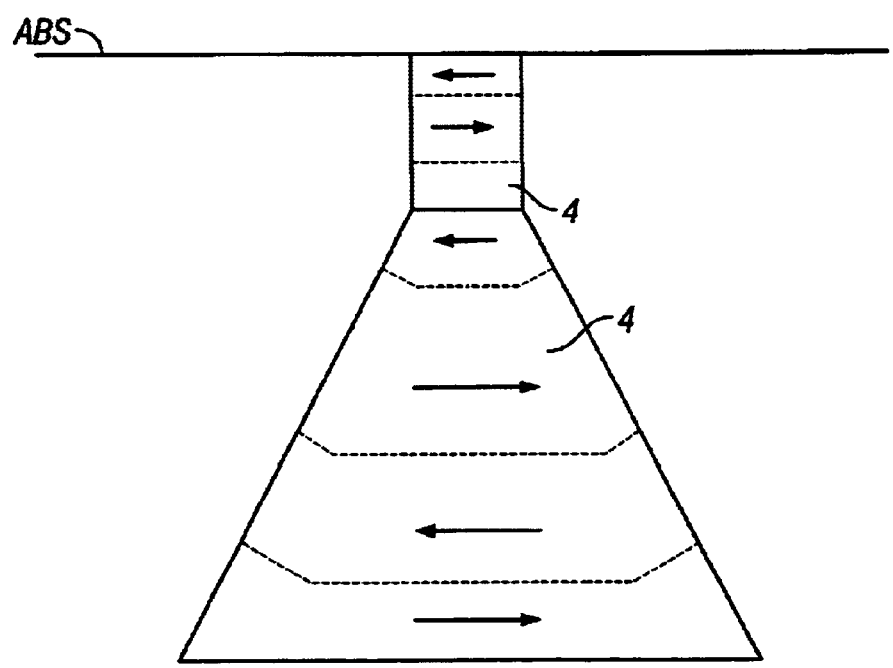

FIGS. 8(a) and 8(b) show exemplary magnetic domains that can be induced in the patterned film 4 of FIG. 3(b) (configured as a magnetic write head) through use of the invention. FIG. 8(a) shows the magnetic domains in the patterned film 4 as a result of the non-ferromagnetic material 6 being applied to create a zero stress anisotropy condition at the edges of the patterned film 4. This is done by forming the non-ferromagnetic material 6 so that it has an intrinsic stress level that equals the intrinsic stress level in the soft ferromagnetic film prior to patterning (i.e., $\sigma_{magnetic} = \sigma_{non-magnetic}$). Thus, if the full film has intrinsic tensile stress, the non-ferromagnetic material 6 will also have intrinsic tensile stress of equal value. The non-ferromagnetic material 6 will then reduce the edge stress anisotropy in the patterned film 4 to zero. The magnetic domains will become oriented with a classical edge closure domain orientation with most of the magnetic domain oriented along the initial easy axis.

FIG. 8(b) shows the magnetic domains in the patterned film 4 as a result of the non-ferromagnetic material 6 being applied to create a non-zero stress anisotropy condition at the edges of the patterned film 4. This is done by forming the non-ferromagnetic material 6 so that it has an intrinsic stress level that is the same sign as the intrinsic stress level in the soft ferromagnetic film prior to patterning, but of higher magnitude (i.e., $|\sigma_{magnetic}| < |\sigma_{non-magnetic}|$). Thus, if the full film has intrinsic tensile stress, the non-ferromagnetic material 6 will also have intrinsic tensile stress, but at a higher level. By inducing stress contributions higher than those present in the ferromagnetic film prior to creation of the non-ferromagnetic film, the edge stress anisotropy will switch direction and the magnetic domains will become oriented as shown in FIG. 8(b).

2. Prior Art Soft Ferromagnetic Film Electroplating Process

Figure 9A:
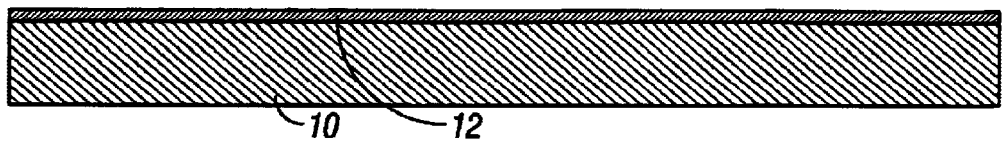
FIGS. 9(a)–9(h) are side sectional views showing a conventional soft ferromagnetic film patterning process.

There are any number of ways to fabricate the magnetic structure 2. Several alternatives are discussed below. Before beginning that discussion, however, it will be helpful to review a conventional frame-plating fabrication technique for making patterned soft ferromagnetic films. These fabrication steps are shown in FIGS. 9(a)–9(f). In FIG. 9(a) an underlying structure 10 receives a seed layer 12. The nature of underlying structure 10 will depend on the application for which the soft ferromagnetic film will be used. For example, if the film is a P1 or P2 pole piece of a magnetic write head, the underlying structure 10 would comprise an insulative layer. In other applications, the underlying structure might be a silicon or semiconductor wafer substrate layer of a device. The seed layer 12 is used to promote the growth of the subsequent soft ferromagnetic film layer to be deposited thereon. If the soft ferromagnetic film is being fabricated as part of a magnetic write head yoke (i.e., a P1 or P2 pole piece), materials that may be used for the seed layer 12 include any of various transition metal growth promoters, such as Rh, Pd, etc., or magnetic films such as NiFe, Fe AlN, CoNiFe, CoFeN, etc.

Figure 9B:
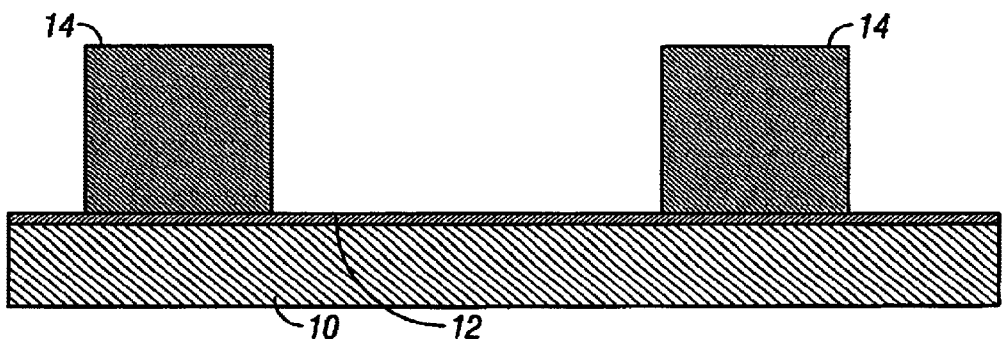
Figure 9C:
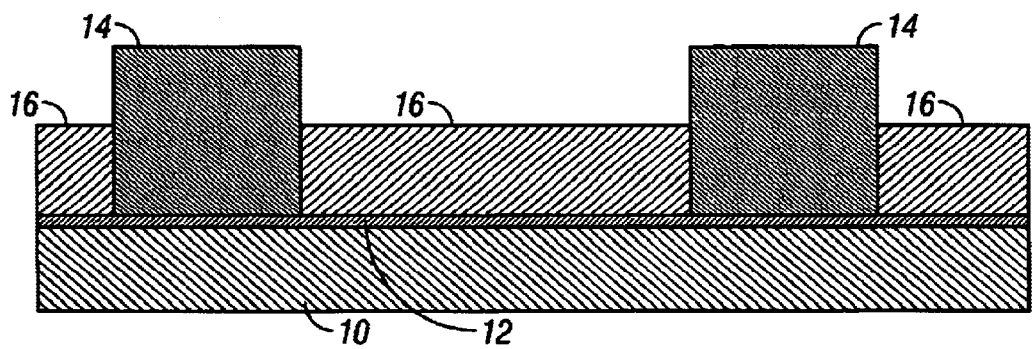
Figure 9D:
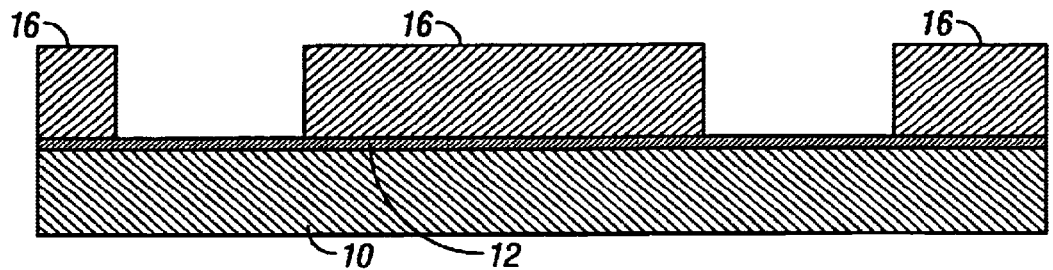
Figure 9E:
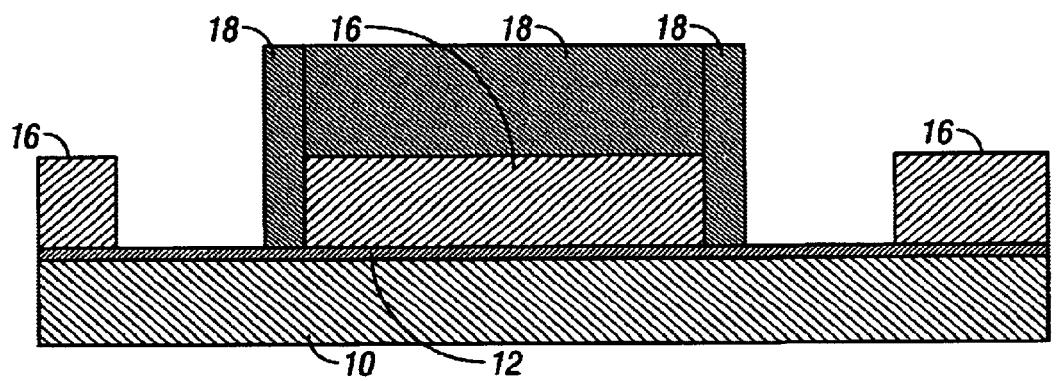
Figure 9F:
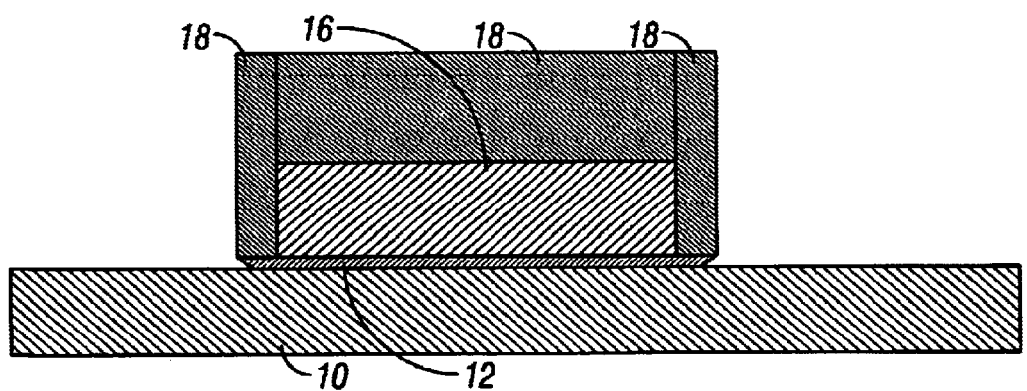
Figure 9G:
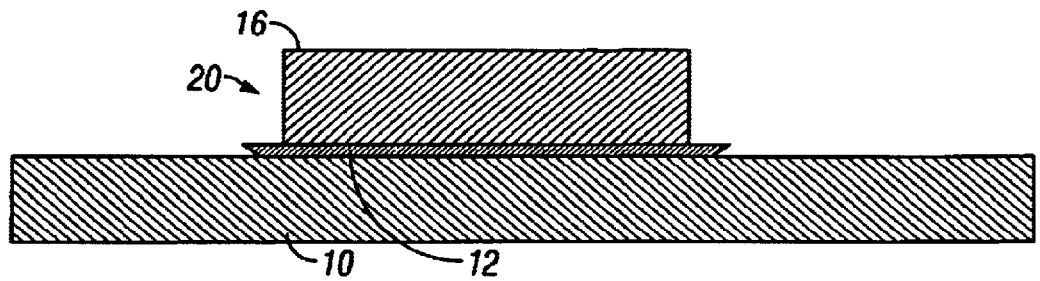
Figure 9H:
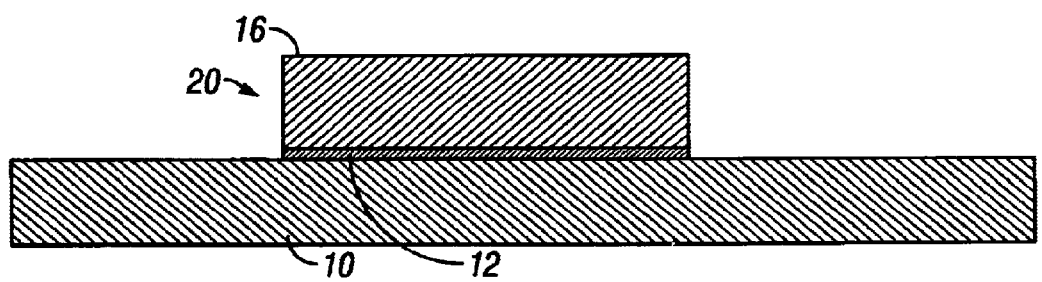

In FIG. 9(b), a photoresist layer 14 comprising a suitable photosensitive polymer is applied via spin coating, and then photo-exposed and developed to open a frame for electroplating. In FIG. 9(c), a soft ferromagnetic film 16 is plated in the frame defined by the photoresist layer 14. The application for which the soft ferromagnetic film 16 will be used determines the choice of materials for the film. For example, if the structure being fabricated is a magnetic write head yoke or pole tip structure, materials that may be used for the soft ferromagnetic film 16 include any of various ferromagnetic transition metal alloys, including alloys of nickel-iron (permalloy), nickel-iron-cobalt alloys, etc. In FIG. 9(d), the photoresist layer 14 is dissolved. In FIG. 9(e), a new photoresist layer 18 is spun on, photo-exposed and developed so as to cover the structure of interest. In FIG. 9(f), the soft ferromagnetic film 14 and the seed layer 12 are chemically etched away in the region not covered by the photoresist layer 18. In FIG. 9(g), the photoresist layer 18 is removed. In FIG. 9(h), the portion of the seed layer extending beyond the soft ferromagnetic film 14 is removed by sputter etching, leaving only the desired soft ferromagnetic structure 20.

3. Exemplary Electroplating Processes According to the Invention

Figure 10A:
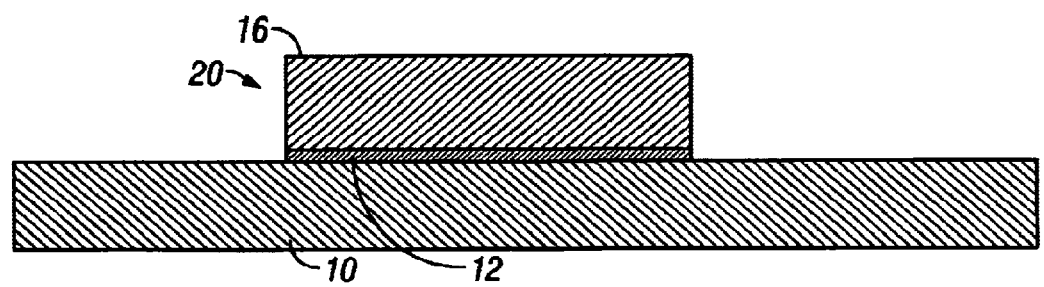
FIGS. 10(a)–10(f) are side sectional views showing an exemplary soft ferromagnetic film patterning process according to the invention.
Figure 10B:
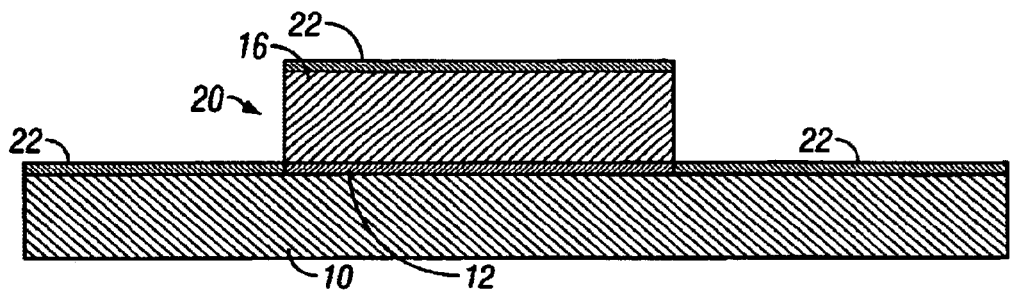
Figure 10C:
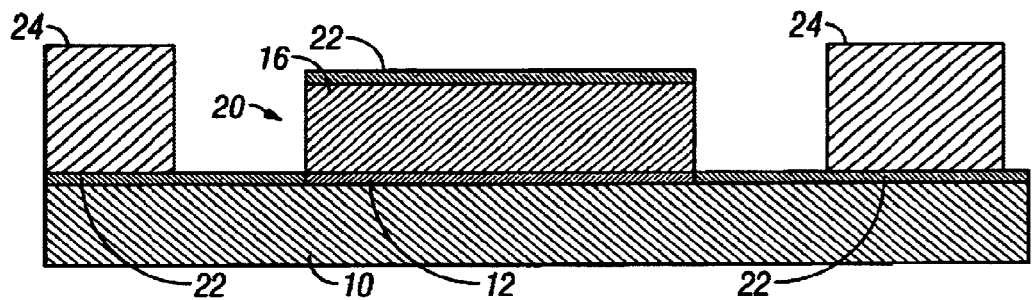
Figure 10D:
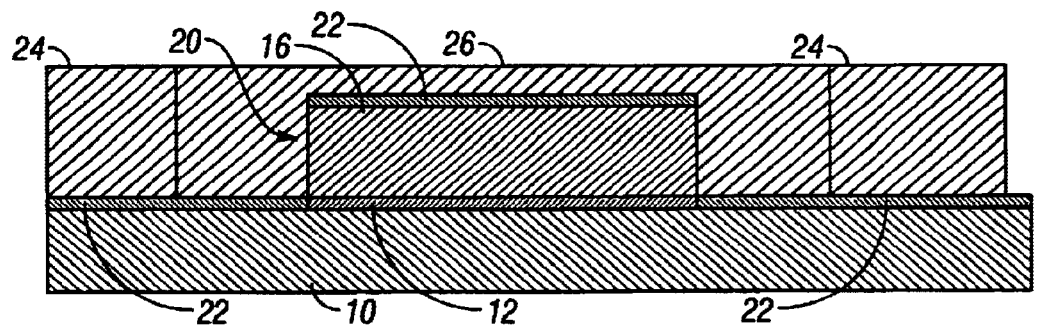
Figure 10E:
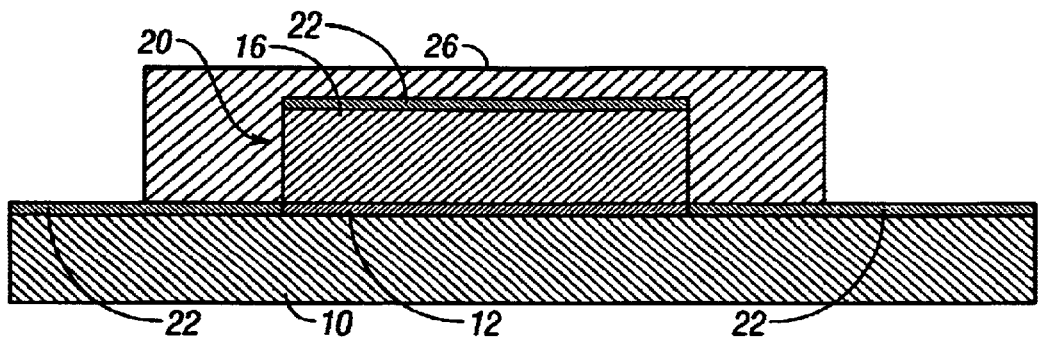
Figure 10F:
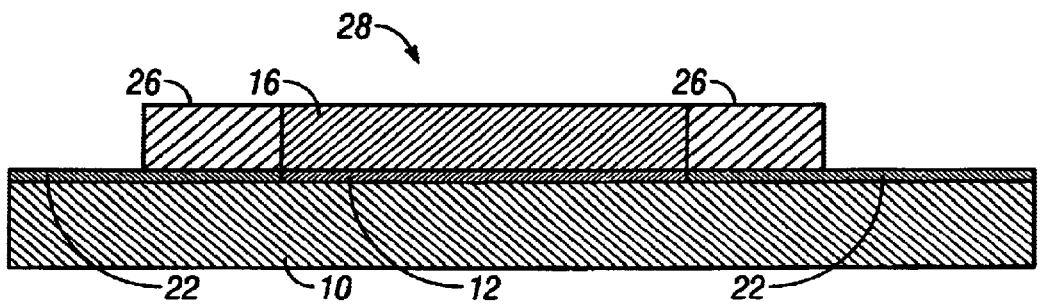

A. Plated Soft Ferromagnetic Film Layer Followed by Plated Non-Ferromagnetic Film Layer—First Alternative Turning now to FIGS. 10(a)–10(f), the steps used to form a magnetic domain-controlled, patterned soft ferromagnetic film according to one exemplary embodiment of the invention are shown. The starting point for this process is the formation of the structure of FIG. 9(h) of the conventional fabrication process described above. In other words, the process now to be described will begin with the structure 20 comprising the soft ferromagnetic film layer 16 being fully formed and patterned. This condition is shown in FIG. 10(a). In FIG. 10(b), a seed layer 22 is deposited for promoting the growth of the subsequent non-ferromagnetic layer. In FIG. 10(c), a photoresist layer 24 is spun on, photo-exposed and developed so as to open a frame for electroplating. In FIG. 10(d), a non-ferromagnetic film layer 26 is plated in the frame defined by the photoresist layer 24. In FIG. 10(e), the photoresist layer 24 is removed. In FIG. 10(f), the soft ferromagnetic film layer 16 and the non-ferromagnetic film layer 26 are planarized using chemical mechanical polishing to produce the structure of interest 28. Advantageously, the soft ferromagnetic film layer 16 of the final structure will have controlled magnetic domain orientations, with consequent elimination or reversal of the edge stress anisotropy therein, by virtue of the stress contributions provided by the non-ferromagnetic film layer 26.

Suitable non-ferromagnetic materials that may be used in the foregoing process include palladium, copper, nickel-phosphorus alloy, or any other suitable non-magnetic electroplatable material (if electroplating is being used). Selection of a suitable non-ferromagnetic material should also involve consideration of its ability of to affect the stress levels in the soft ferromagnetic film layer 16. For example, non-ferromagnetic materials that exhibit relatively high tensile stress following electroplating can pull the soft ferromagnetic film material in a direction perpendicular to its edges, thereby further ensuring that the film's magnetic anisotropy is oriented in the desired direction relative to the direction of magnetic flux propagation. At the same time, the non-ferromagnetic material's stiffness properties must also be considered insofar as a material that is too elastic will tend to stretch under the influence of the soft ferromagnetic film's edge stress, without inducing adequate counterbalancing stress concentrations. Consideration should also be given to whether annealing is appropriate following electroplating of the non-ferromagnetic layer 26 in order to improve the edge stress characteristics of the soft ferromagnetic film layer 16.

Figure 11A:
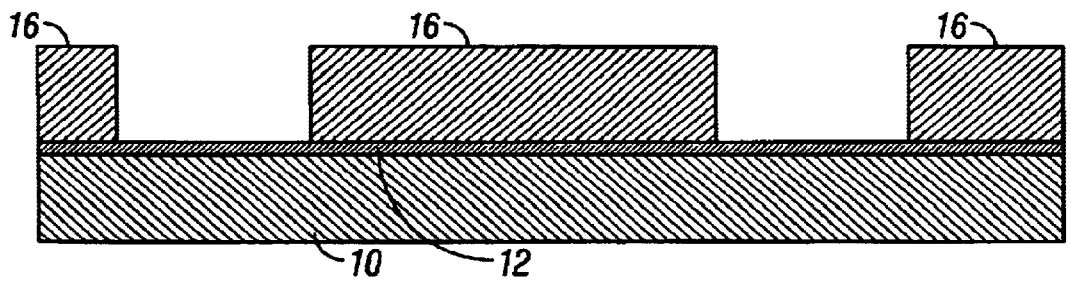
FIGS. 11(a)–11(h) are side sectional views showing another exemplary soft ferromagnetic film patterning process according to the invention.
Figure 11B:
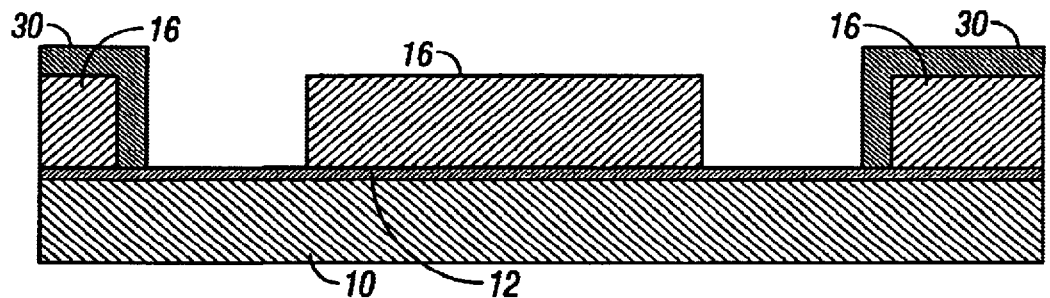
Figure 11C:
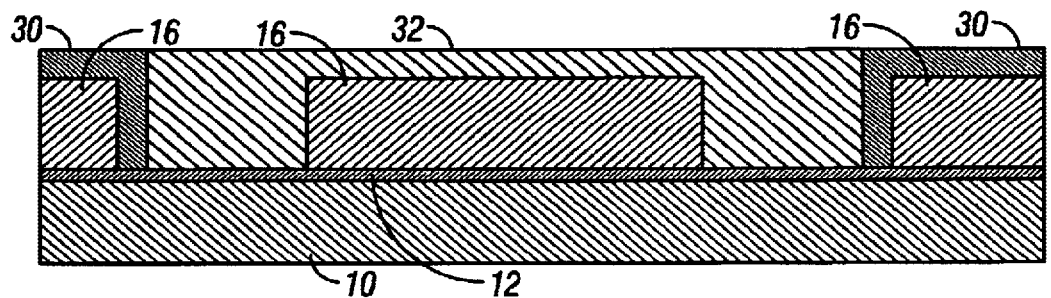
Figure 11D:
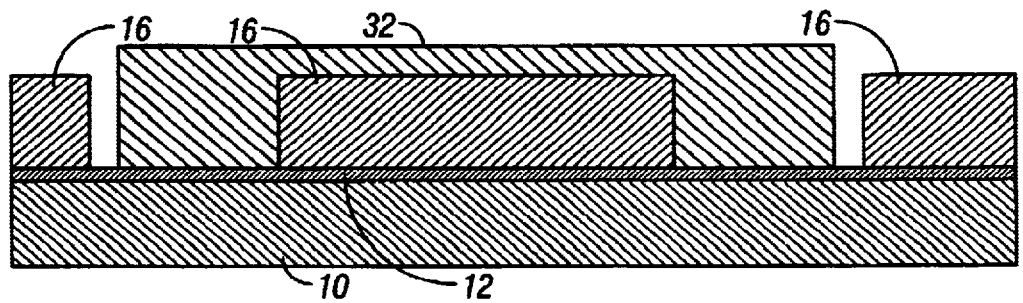
Figure 11E:
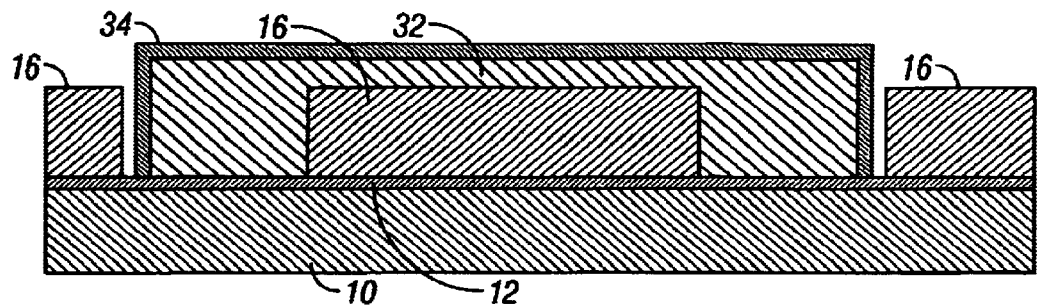
Figure 11F:
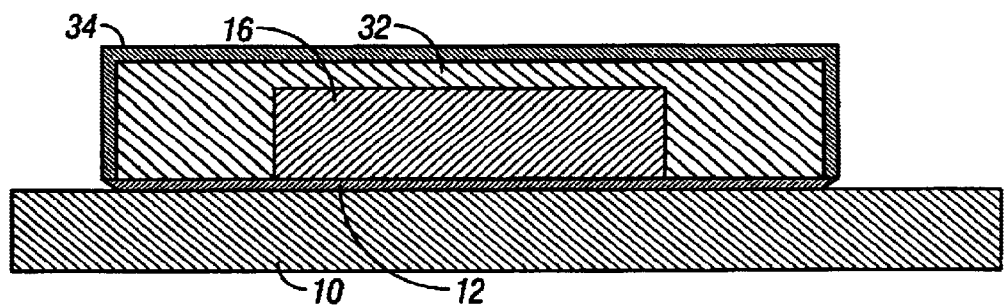
Figure 11G:
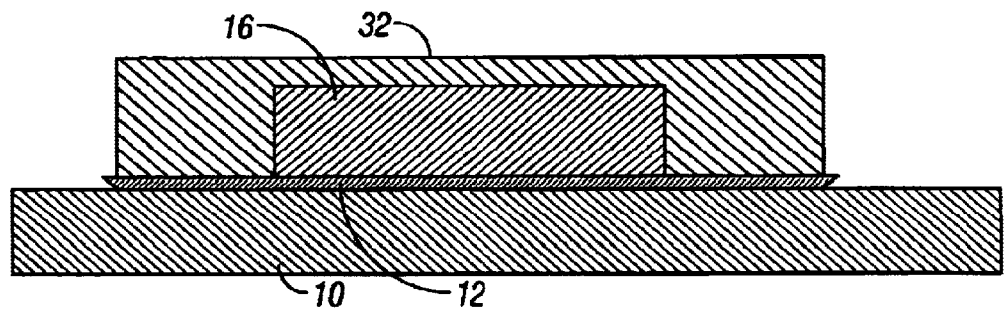
Figure 11H:
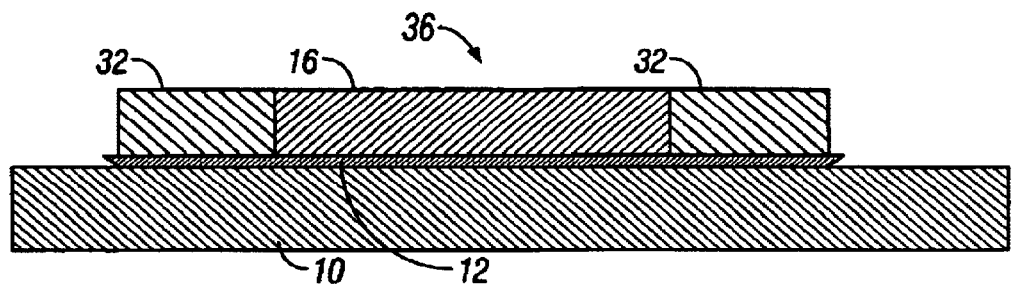

B. Plated Soft Ferromagnetic Film Layer Followed by Plated Non-Ferromagnetic Film Layer—Second Alternative Turning now to FIGS. 11(a)–11(h), the steps used to form a magnetic domain-controlled, patterned soft ferromagnetic film according to another exemplary embodiment of the invention are shown. The starting point for this process is the formation of the structure of FIG. 9(d) of the conventional fabrication process described above. In other words, the process now to be described will begin with the soft ferromagnetic film layer 16 being plated and the photoresist layer 14 being removed. This condition is shown in FIG. 11(a). In FIG. 11(b), a second photoresist layer 30 is spun on, photo-exposed and developed so as to open a frame for electroplating. In FIG. 11(c), a non-ferromagnetic film layer 32 is plated in the frame defined by the photoresist layer 30. This non-ferromagnetic layer can be formed using any of the non-ferromagnetic materials described above relative to the structure produced according to FIGS. 10(a)–10(e). In FIG. 11(d), the photoresist layer 30 is removed. In FIG. 11(e), a third photoresist layer 34 is applied to cover the non-ferromagnetic film layer 32 and the soft ferromagnetic film layer 16. In FIG. 11(f), the portions of the soft ferromagnetic film layer 16 that lie outside the photoresist layer 30 are removed by wet chemical etching. In FIG. 11(g), the photoresist layer 30 is removed. In FIG. 11(h), the soft ferromagnetic film layer 16 and the non-ferromagnetic film layer 32 are planarized using chemical mechanical polishing to produce the structure of interest 36.

Figure 12A:
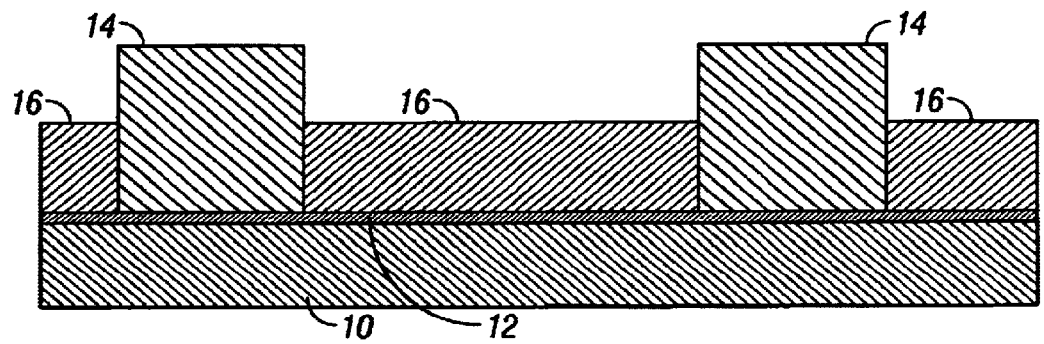
FIGS. 12(a)–12(j) are side sectional views showing another exemplary soft ferromagnetic film patterning process according to the invention.
Figure 12B:
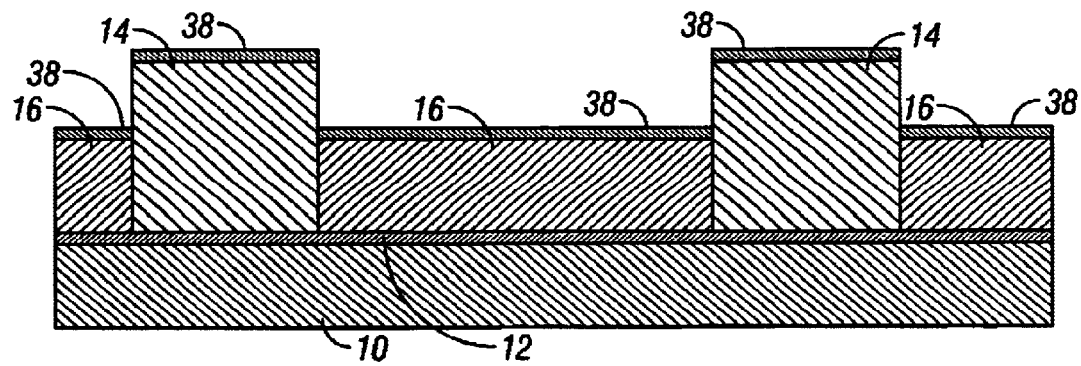
Figure 12C:
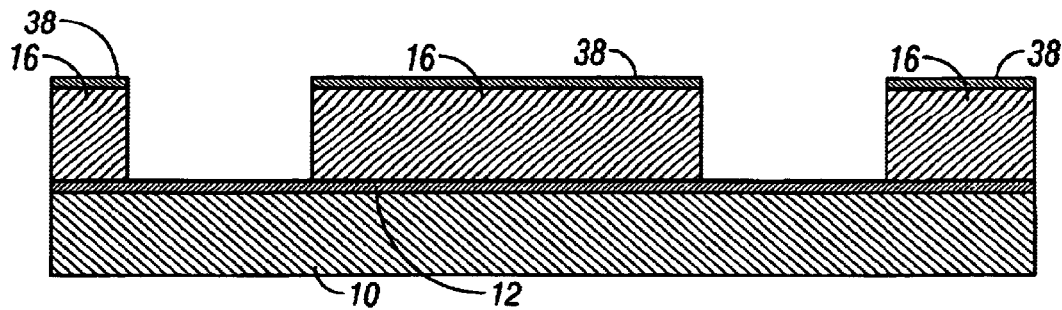
Figure 12D:
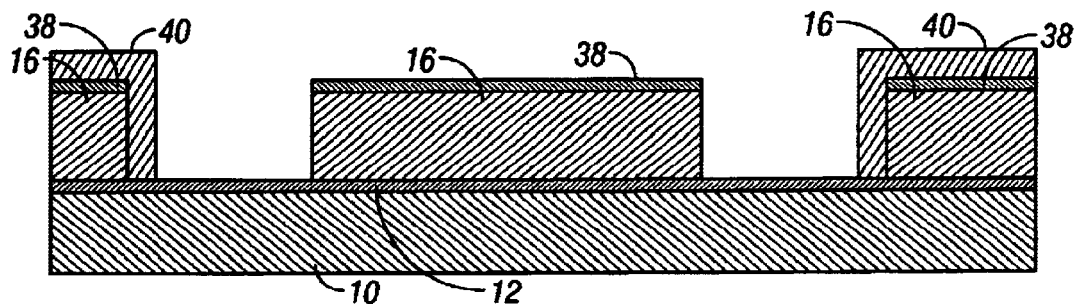
Figure 12E:
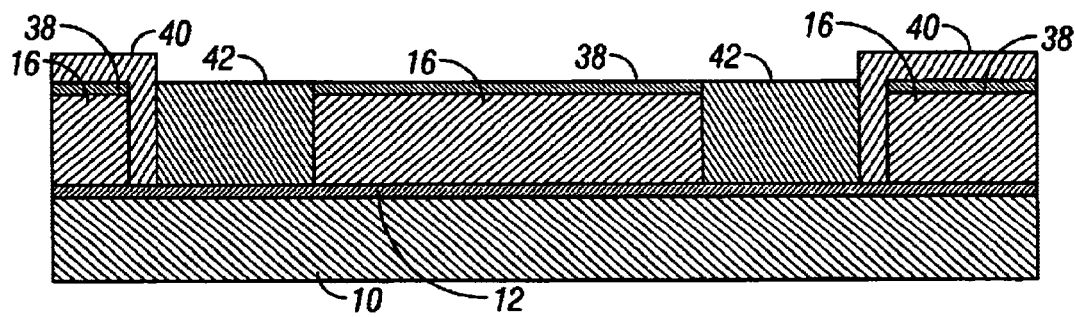
Figure 12F:
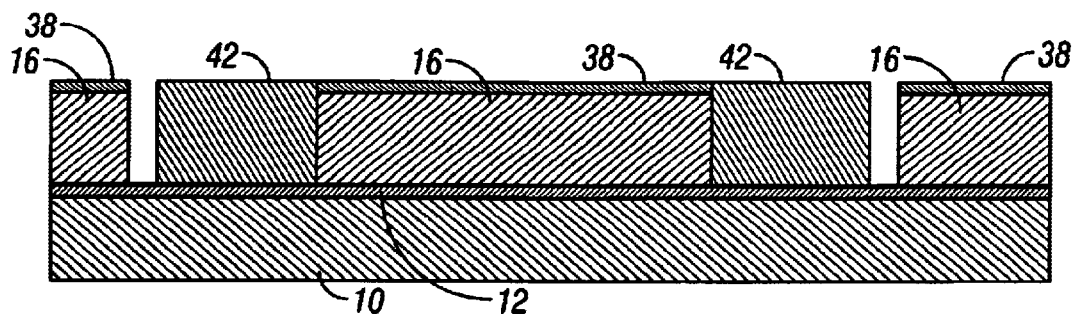
Figure 12G:
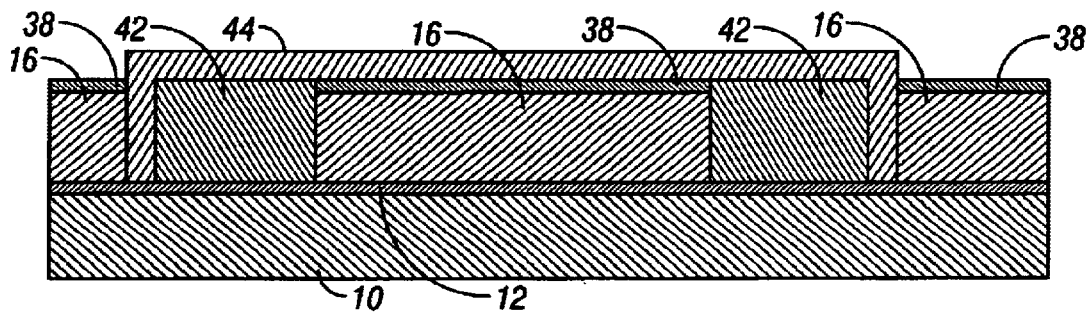
Figure 12H:
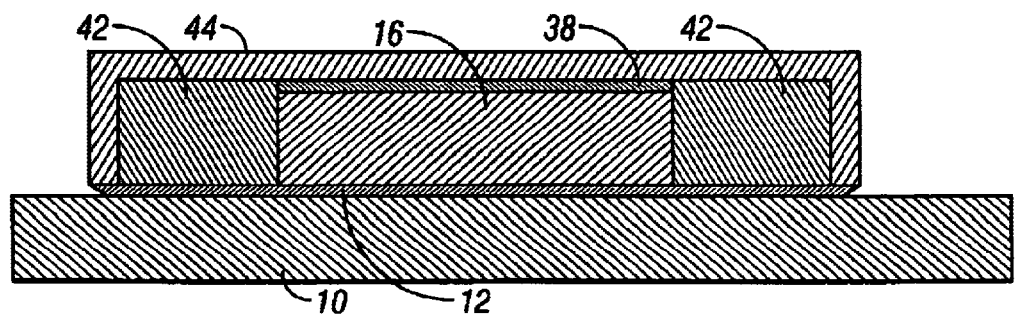
Figure 12I:
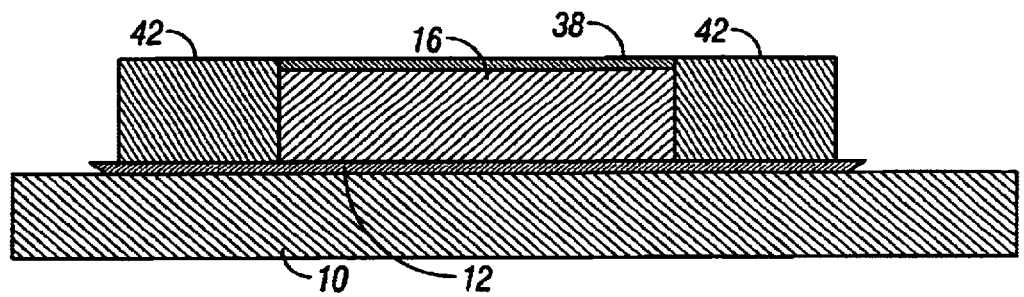
Figure 12J:
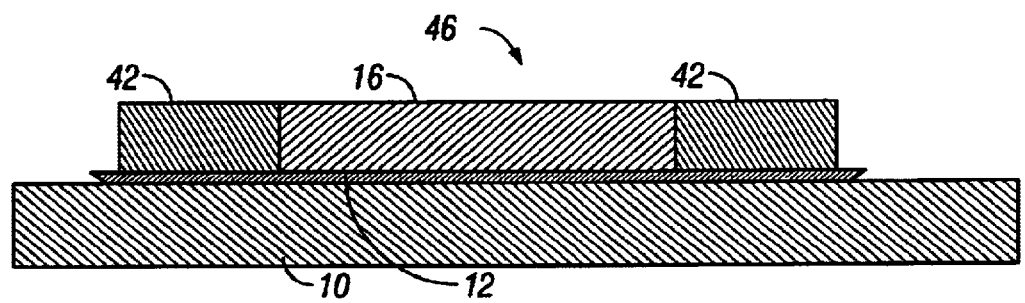

C. Plated Soft Ferromagnetic Film Layer Followed by Plated Non-Ferromagnetic Film Layer—Third Alternative Turning now to FIGS. 12(a)–12(j), the steps used to form a magnetic domain-controlled, patterned soft ferromagnetic film according to another exemplary embodiment of the invention are shown. The starting point for this process is the formation of the structure of FIG. 9(c) of the conventional fabrication process described above. In other words, the process now to be described will begin with the soft ferromagnetic film layer 16 being plated and the photoresist layer 14 remaining in position. This condition is shown in FIG. 12(a). In FIG. 12(b), an insulator film layer 38 made from $Al_2O_3$, $SiO_2$, or the like, is applied via vacuum deposition onto the existing structure. In FIG. 12(c), the photoresist layer 14 is removed, and this removal serves as a lift-off process for the insulator film layer 38. In FIG. 12(d), a second photoresist layer 40 is spun on, photo-exposed and developed so as to open a frame for electroplating. In FIG. 12(e), a non-ferromagnetic film layer 42 is plated in the frame defined by the photoresist layer 40. This non-ferromagnetic layer can be formed using any of the non-ferromagnetic materials described above relative to the structure produced according to FIGS. 10(a)–10(e). In FIG. 12(f), the photoresist layer 40 is removed. In FIG. 12(g), a third photoresist layer 44 is applied to cover the non-ferromagnetic film layer 42 and the soft ferromagnetic film layer 16. In FIG. 12(h), the portions of the soft ferromagnetic film layer 16 that lie outside the photoresist layer 44 are removed by wet chemical etching. In FIG. 12(i), the photoresist layer 44 is removed. In FIG. 12(j), the soft ferromagnetic film layer 16 and the non-ferromagnetic film layer 42 are planarized using chemical mechanical polishing to produce the structure of interest 46.

Figure 13A:
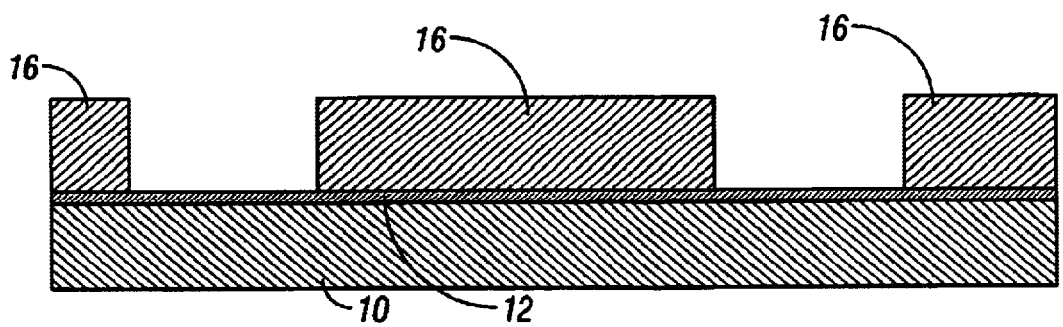
FIGS. 13(a)–13(l) are side sectional views showing another exemplary soft ferromagnetic film patterning process according to the invention.
Figure 13B:
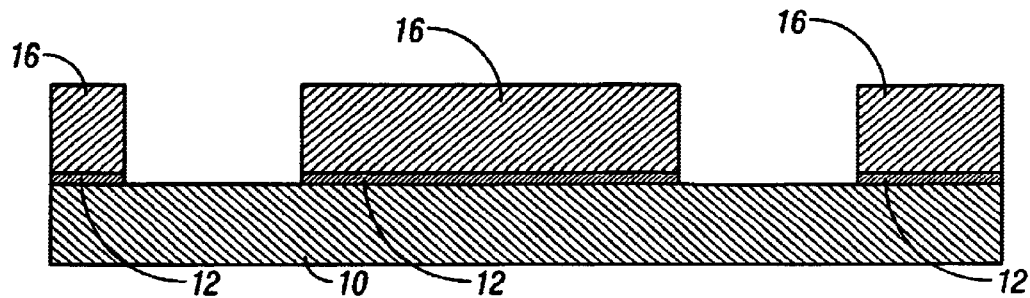
Figure 13C:
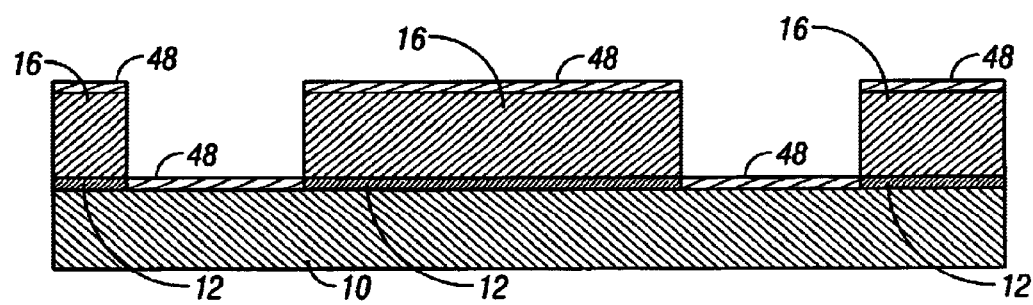
Figure 13D:
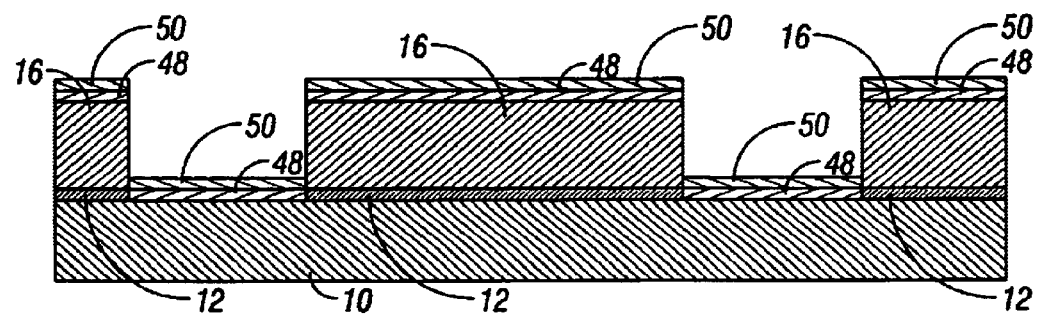
Figure 13E:
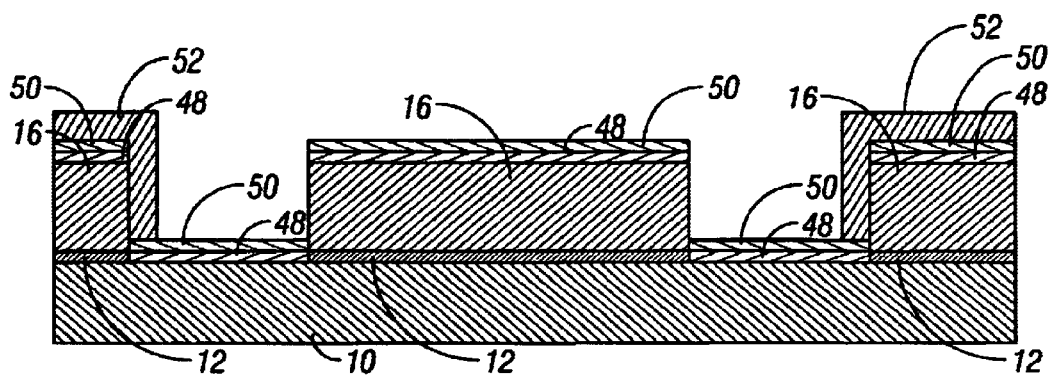
Figure 13F:
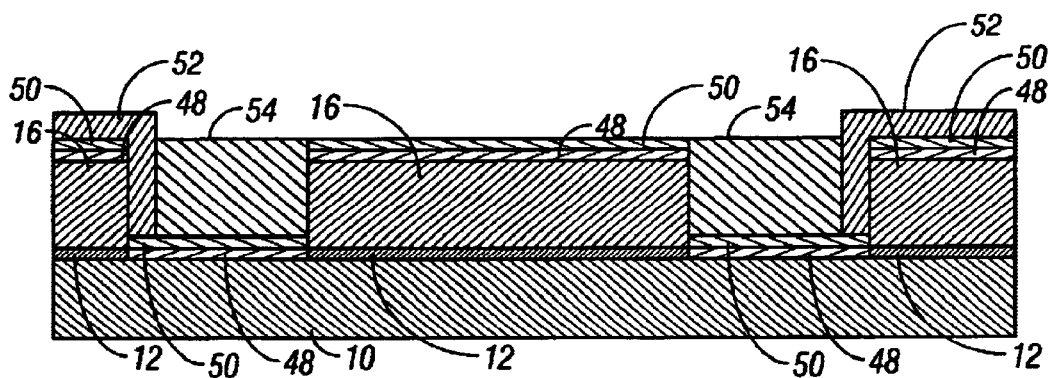
Figure 13G:
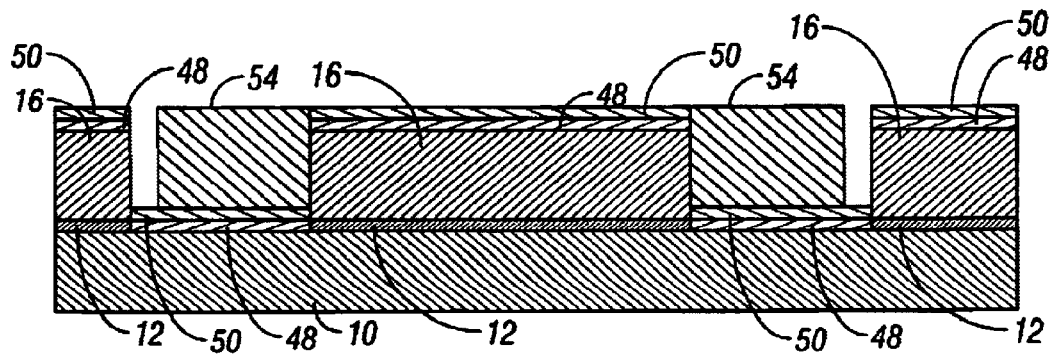
Figure 13H:
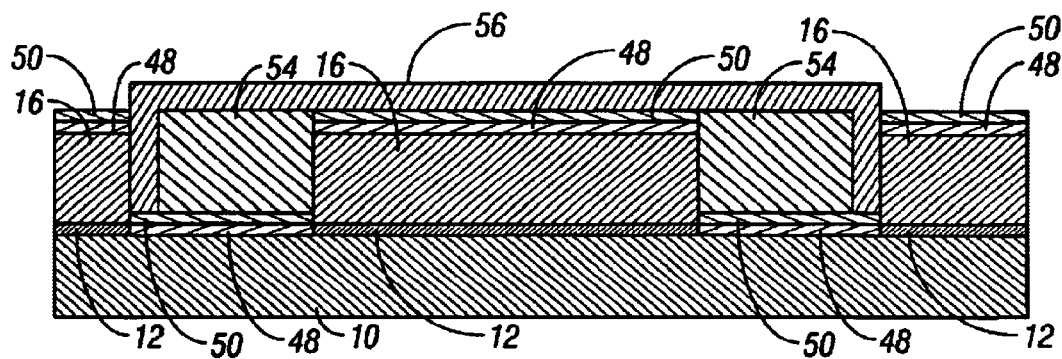
Figure 13I:
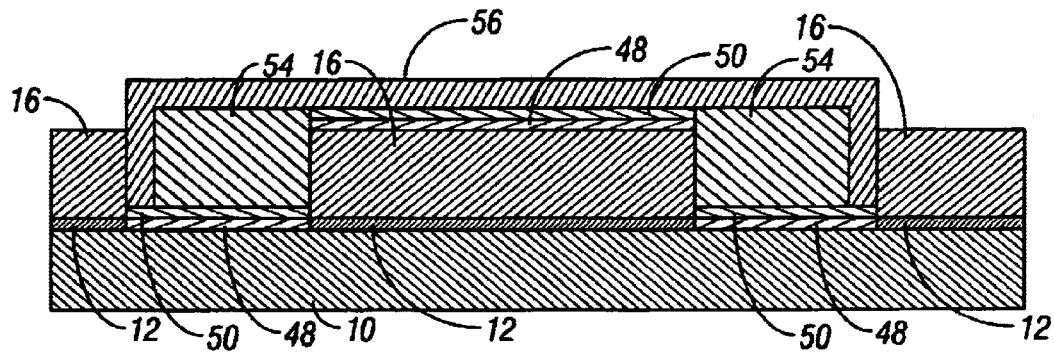
Figure 13J:
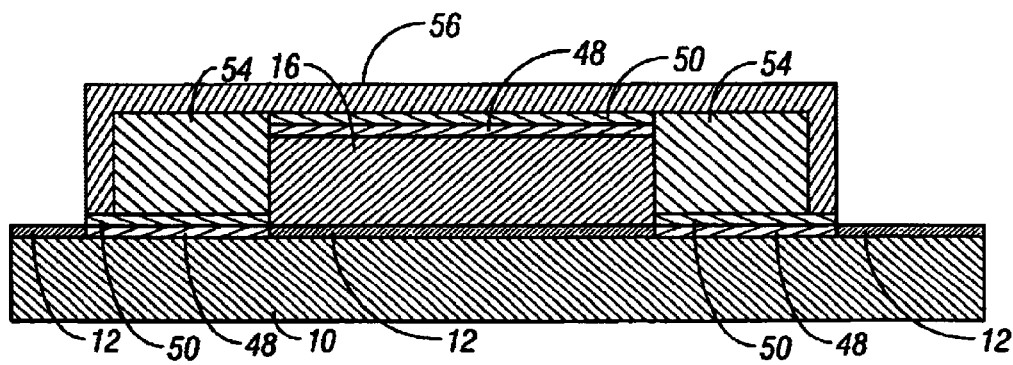
Figure 13K:
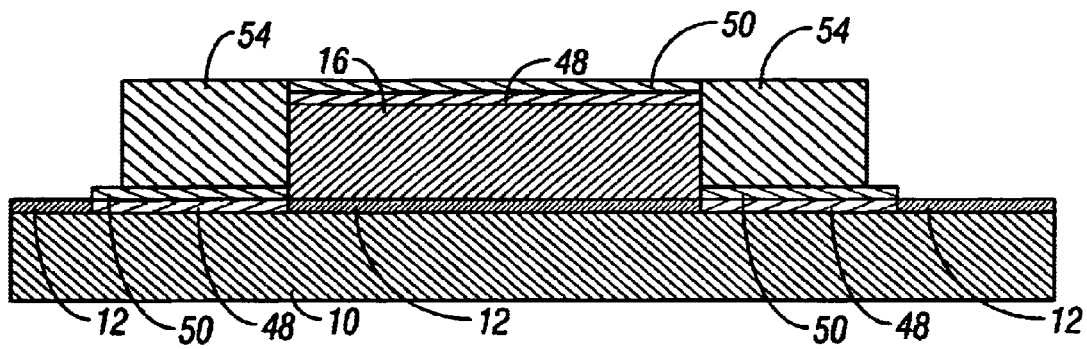
Figure 13L:
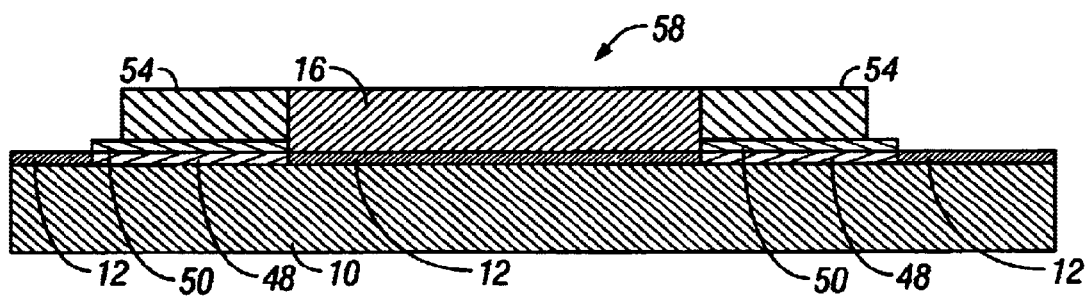

D. Plated Soft Ferromagnetic Film Layer Followed by Plated Non-Ferromagnetic Film Layer—Fourth Alternative Turning now to FIGS. 13(a)–13(l), the steps used to form a magnetic domain-controlled, patterned soft ferromagnetic film according to another exemplary embodiment of the invention are shown. The starting point for this process is the formation of the structure of FIG. 9(d) of the conventional fabrication process described above. In other words, the process now to be described will begin with the soft ferromagnetic film layer 16 being plated and the photoresist layer 14 removed therefrom. This condition is shown in FIG. 13(a). In FIG. 13(b), the existing seed layer 12 is ion milled in the trench area formerly occupied by the photoresist layer 14. In FIG. 13(c), an insulator film layer 48 made from $Al_2O_3$, $SiO_2$, or the like, is applied via vacuum deposition onto the existing structure. In FIG. 13(d), a non-magnetic seed layer 50 is applied via vacuum deposition onto the insulator film layer 48. In FIG. 13(e), a photoresist layer 52 is spun on, photo-exposed and developed so as to open a frame for electroplating. In FIG. 13(f), a non-ferromagnetic film layer 54 is plated in the frame defined by the photoresist layer 52. This non-ferromagnetic layer can be formed using any of the non-ferromagnetic materials described above relative to the structure produced according to FIGS. 10(a)–10(e). In FIG. 13(g), the photoresist layer 52 is removed. In FIG. 13(h), a third photoresist layer 56 is applied to cover the non-ferromagnetic film layer 54 and the soft ferromagnetic film layer 16. In FIG. 13(i), the insulator layer 48 is removed by ion milling. In FIG. 13(j), the portions of the soft ferromagnetic film layer 16 that lie outside the photoresist layer 56 are removed by wet chemical etching. In FIG. 13(k), the photoresist layer 56 is removed. In FIG. 13(l), the soft ferromagnetic film layer 16 and the non-ferromagnetic film layer 54 are planarized using chemical mechanical polishing to produce the structure of interest 58.

Figure 14A:
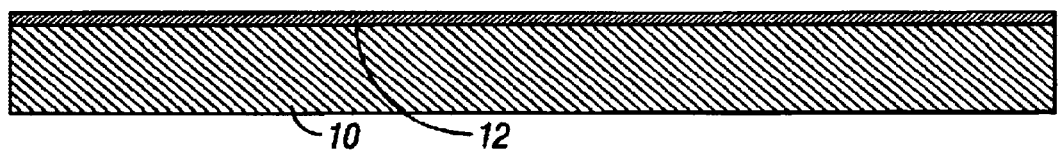
FIGS. 14(a)–14(h) are side sectional views showing another exemplary soft ferromagnetic film patterning process according to the invention.
Figure 14B:
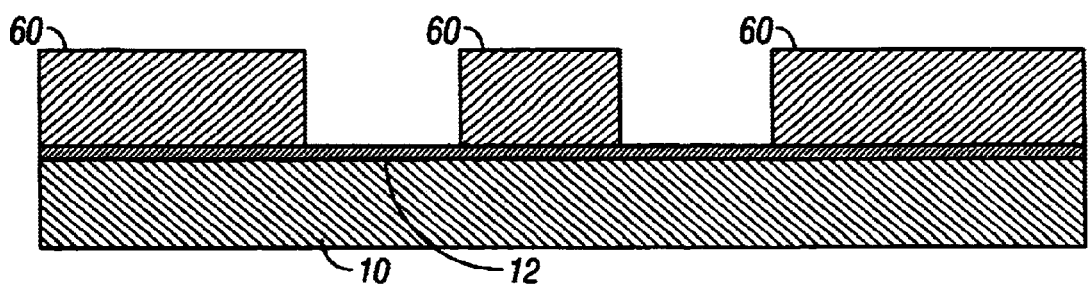
Figure 14C:
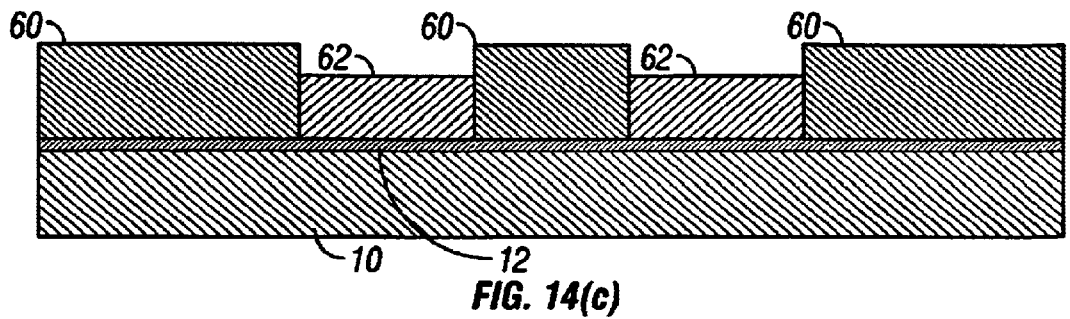
Figure 14D:
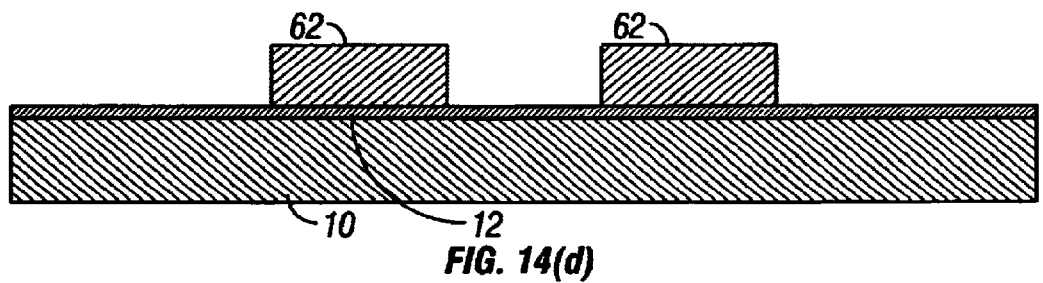
Figure 14E:
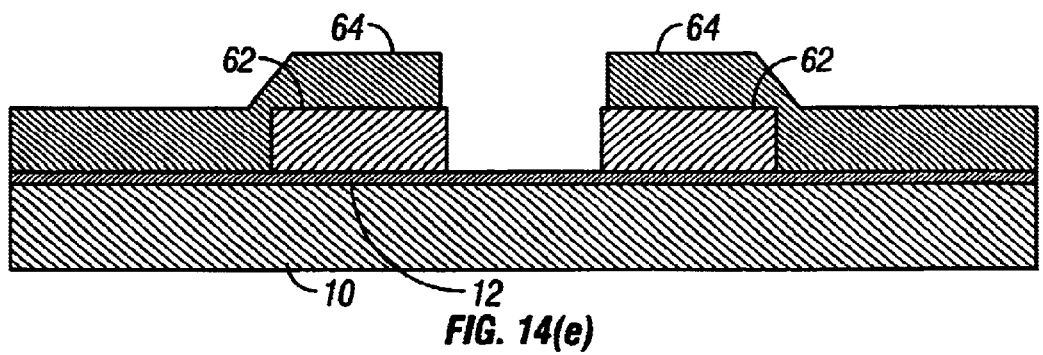
Figure 14F:
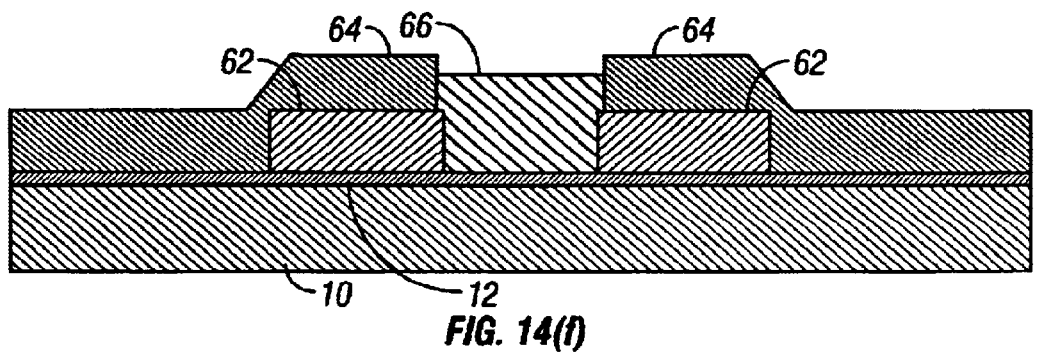
Figure 14G:
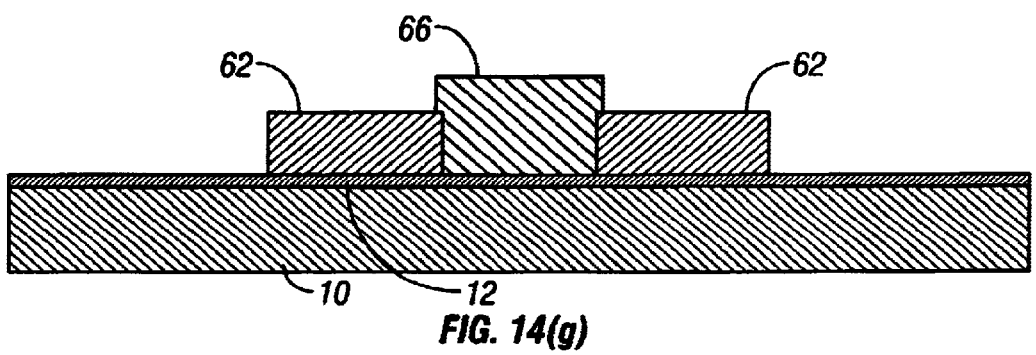
Figure 14H:
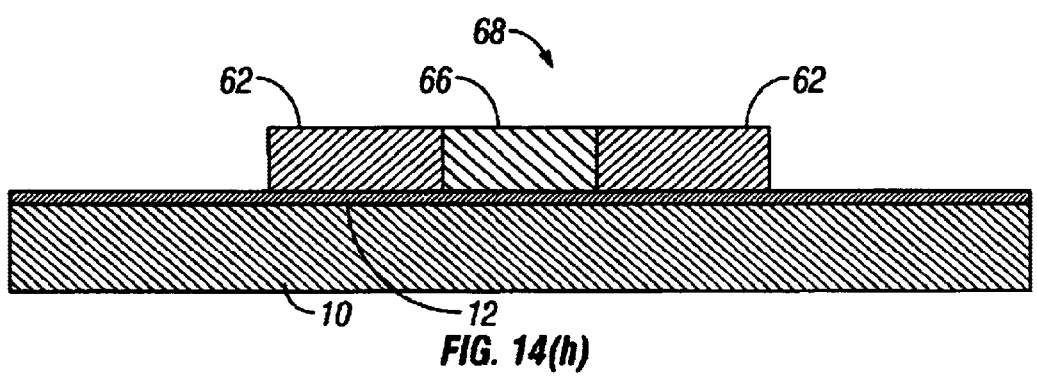

E. Plated Non-Ferromagnetic Film Layer Followed by Plated Soft Ferromagnetic Film Layer Turning now to FIGS. 14(a)–14(h), the steps used to form a magnetic domain-controlled, patterned soft ferromagnetic film according to another exemplary embodiment of the invention are shown. In this process, the non-ferromagnetic portion of the structure is formed prior to the soft ferromagnetic film portion. The starting point for this process is the formation of the structure of FIG. 9(b) of the conventional fabrication process described above. In other words, the process now to be described will begin with the seed layer 12 being formed on the substrate 10. Note that the seed layer 12 may either be a magnetic or non-magnetic material. This condition is shown in FIG. 14(a). In FIG. 14(b), a photoresist layer 60 is spun on, photo-exposed and developed so as to open a frame for electroplating. In FIG. 14(c), a non-ferromagnetic film layer 62 is plated in the frame defined by the photoresist layer 60. This non-ferromagnetic layer can be formed using any of the non-ferromagnetic materials described above relative to the structure produced according to FIGS. 10(a)–10(e). In FIG. 14(d), the photoresist layer 60 is removed. In FIG. 14(e), a second photoresist layer 64 is spun on, photo-exposed and developed so as to open a frame for electroplating. This frame is located between the two structures comprising the non-ferromagnetic film layer 62. In FIG. 14(f), a soft ferromagnetic film layer 66 is plated in the frame defined by the photoresist layer 64. In FIG. 14(g), the photoresist layer 64 is removed. In FIG. 14(h), the soft ferromagnetic film layer 66 and the non-ferromagnetic film layer 62 are planarized using chemical mechanical polishing to produce the structure of interest 68.

4. Exemplary Hybrid Electroplating/Deposition Processes According to the Invention

Figure 15A:
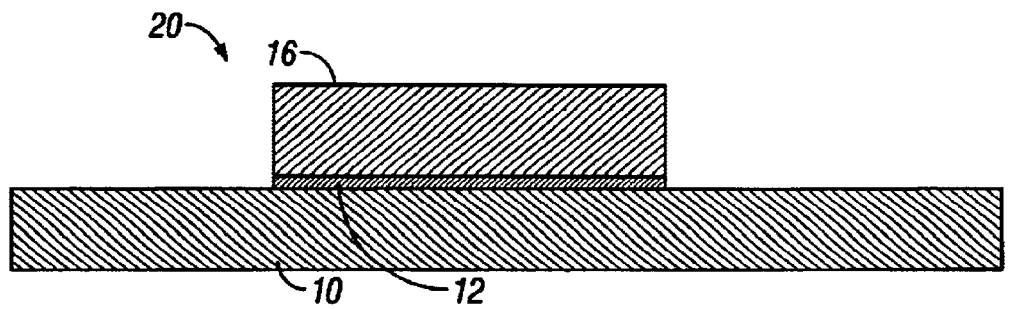
FIGS. 15(a)–15(e) are side sectional views showing another exemplary soft ferromagnetic film patterning process according to the invention.
Figure 15B:
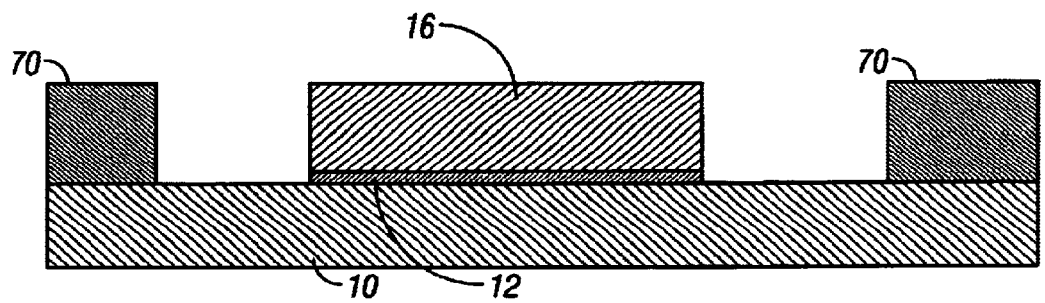
Figure 15C:
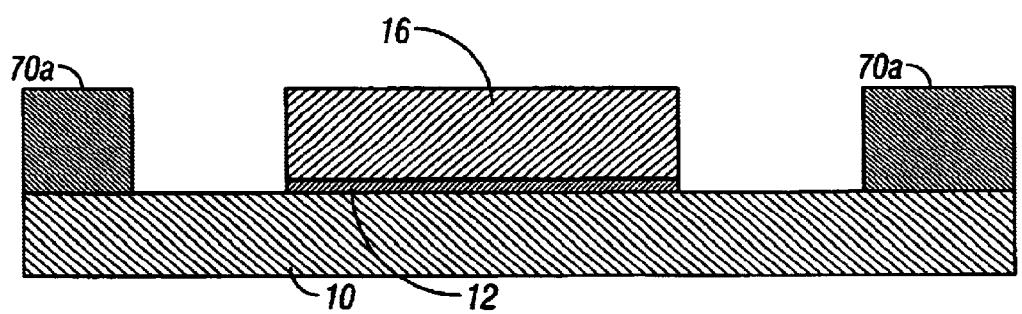
Figure 15D:
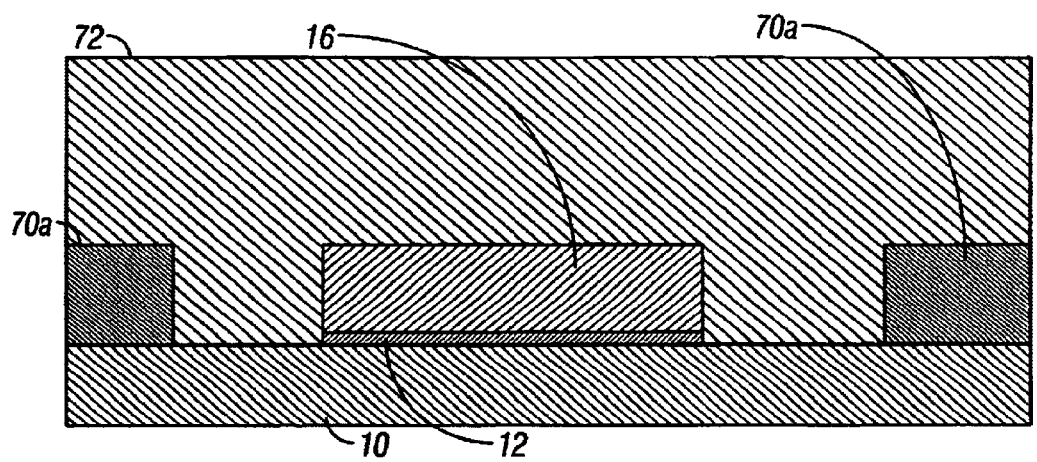
Figure 15E:
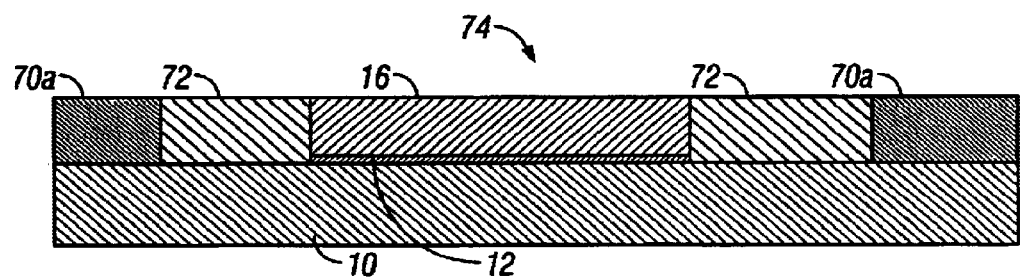

A. Plated Soft Ferromagnetic Film Layer Followed by Deposition of Non-Ferromagnetic Film Layer Turning now to FIGS. 15(a)–15(e), the steps used to form a magnetic domain-controlled, patterned soft ferromagnetic film according to another exemplary embodiment of the invention are shown. The starting point for this process is the formation of the structure of FIG. 9(h) of the conventional fabrication process described above. In other words, the process now to be described will begin with the structure 20 comprising the soft ferromagnetic film layer 16 being fully formed and patterned. This condition is shown in FIG. 15(a). In FIG. 15(b), a photoresist layer 70 is spun on, photo-exposed and developed so as to remove photoresist material from the areas where the non-magnetic film layer are desired. In FIG. 15(c), the photoresist material is hard baked at elevated temperature to promote cross-linking and formation of a hard polymer film layer 70a. In FIG. 15(d), a non-ferromagnetic film layer 72 is applied by vacuum deposition over the existing structure. The non-ferromagnetic layer 72 can be formed using any of the non-ferromagnetic materials described above relative to the structure produced according to FIGS. 10(a)–10(e). In FIG. 15(e), the soft ferromagnetic film layer 16, the non-ferromagnetic film layer 72 and the hard baked resist 70a are planarized using chemical mechanical polishing to produce the structure of interest 74.

Figure 16A:
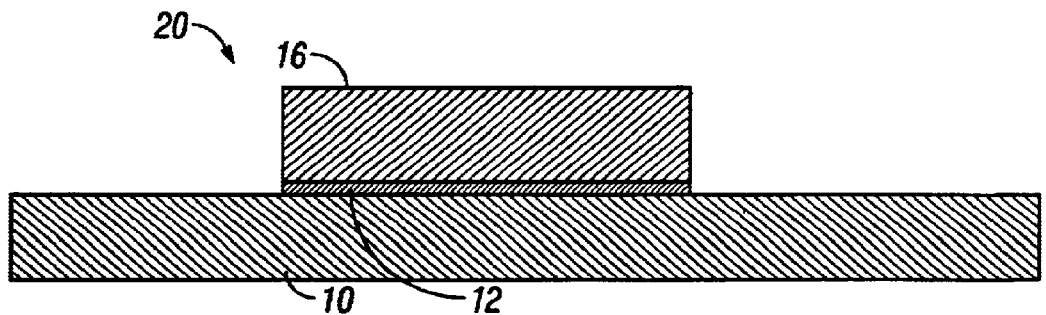
FIGS. 16(a)–16(c) are side sectional views showing another exemplary soft ferromagnetic film patterning process according to the invention.
Figure 16B:
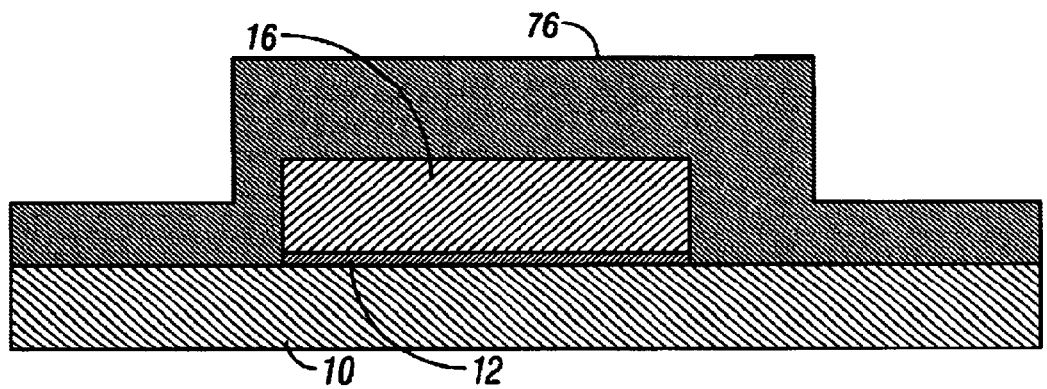
Figure 16C:
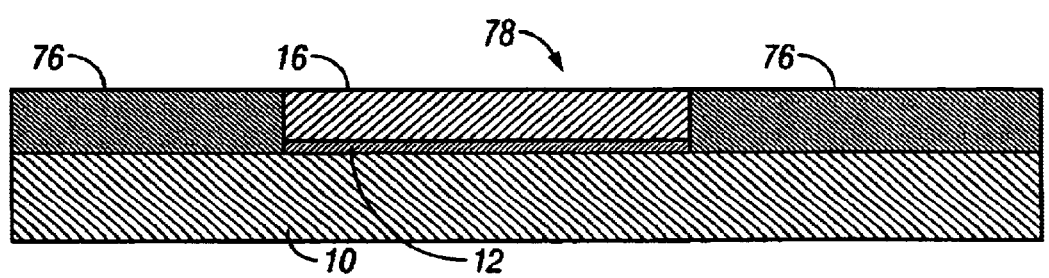

B. Plated Soft Ferromagnetic Film Layer Followed by Deposition of Non-Metallic Insulator Film Layer Turning now to FIGS. 16(a)–16(c), the steps used to form a magnetic domain-controlled, patterned soft ferromagnetic film according to another exemplary embodiment of the invention are shown. The starting point for this process is the formation of the structure of FIG. 9(h) of the conventional fabrication process described above. In other words, the process now to be described will begin with the structure 20 comprising the soft ferromagnetic film layer 16 being fully formed and patterned. This condition is shown in FIG. 16(a). In FIG. 16(b), a non-metallic insulator film layer 76 is applied by vacuum deposition over the existing structure at a thickness that is larger than the thickness of the soft ferromagnetic film layer 16. This non-metallic layer can be formed using any suitable non-metallic stress relieving insulator material, such as $Al_2O_3$, $SiO_2$, and the like. In FIG. 16(c), the soft ferromagnetic film layer 16 and the non-ferromagnetic film layer 76 are planarized using chemical mechanical polishing to produce the structure of interest 78.

5. Exemplary Self-Aligning Deposition Process According to the Invention

Figure 17A:
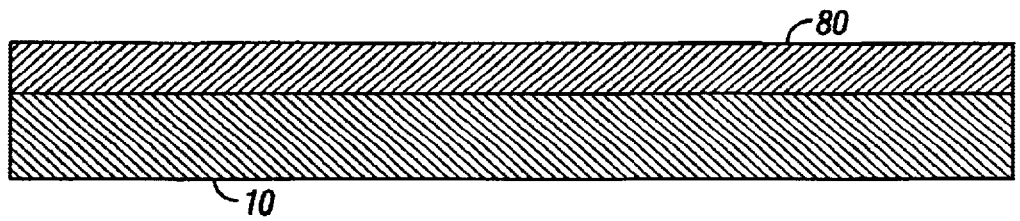
FIGS. 17(a)–17(e) are side sectional views showing another exemplary soft ferromagnetic film patterning process according to the invention.
Figure 17B:
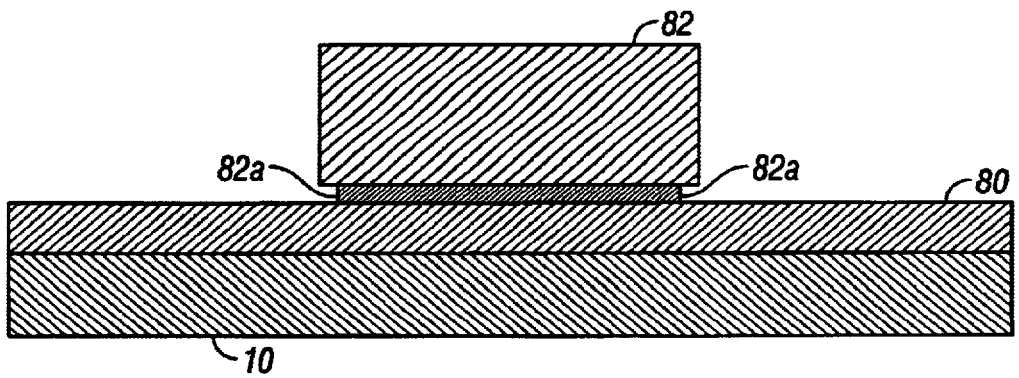

Turning now to FIGS. 17(a)–17(e), the steps used to form a magnetic domain-controlled, patterned soft ferromagnetic film according to another exemplary embodiment of the invention are shown. The starting point for this process is the formation of the structure of FIG. 9(a) of the conventional fabrication process described above. In other words, the process now to be described will begin with the substrate 10 being the only structure. This condition is shown in FIG. 17(a). In FIG. 17(b), a ferromagnetic film layer 80 is vacuum deposited onto the substrate 10. This ferromagnetic layer can be formed using any of the same ferromagnetic materials used for plating. In addition, other ferromagnetic materials may be used, such as Sendust and alloys of cobalt-zirconium-niobium, cobalt-zirconium-tantalum, and cobalt-iron-boron, particularly if the structure being made is a P1 or P2 pole piece for a magnetic write head. In FIG.

Figure 17C:
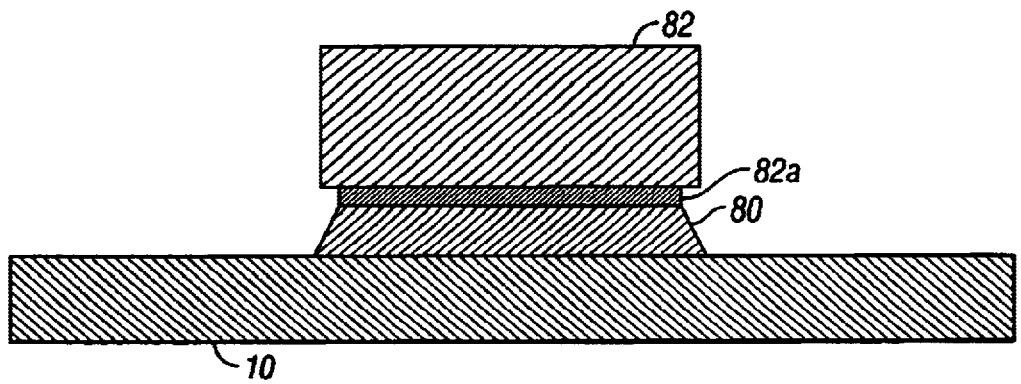
Figure 17D:
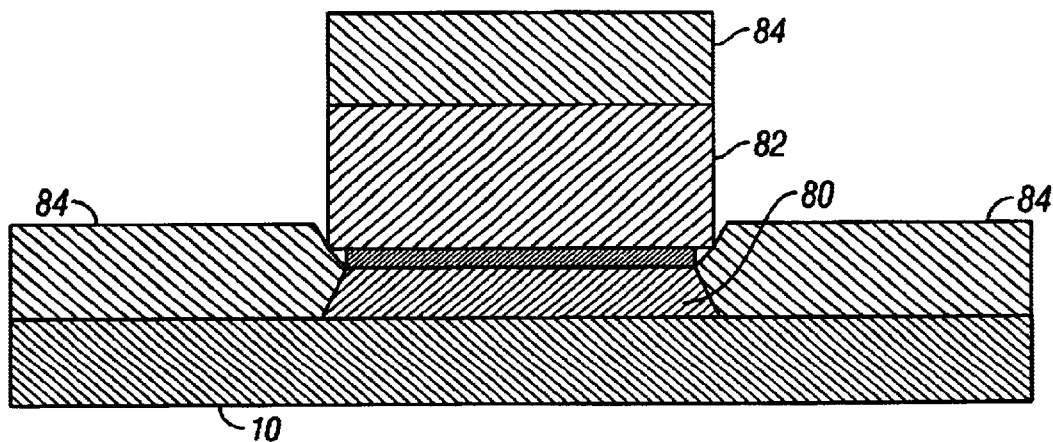
Figure 17E:
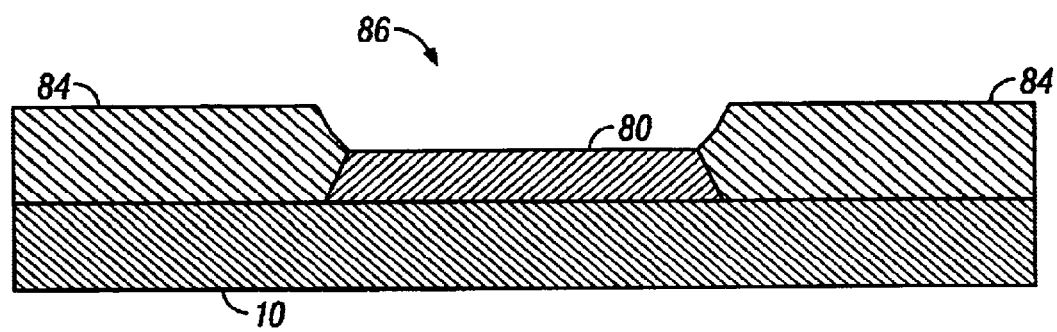

17(b), a photoresist layer 82 with a PMGI under layer is spun on, photo-exposed and developed to produce a resist structure having an undercut 82a. In FIG. 17(c), the ferromagnetic film layer 80 is ion milled to remove all ferromagnetic material except in the area protected by the resist structure. In FIG. 17(d), a non-ferromagnetic metallic or non-metallic film layer 84 is deposited by vacuum deposition onto the underlying structure. In FIG. 17(e), the photoresist layer 82 is removed using a conventional lift of process to produce the structure of interest 86.

6. Magnetic Recording Applications

Figure 18:
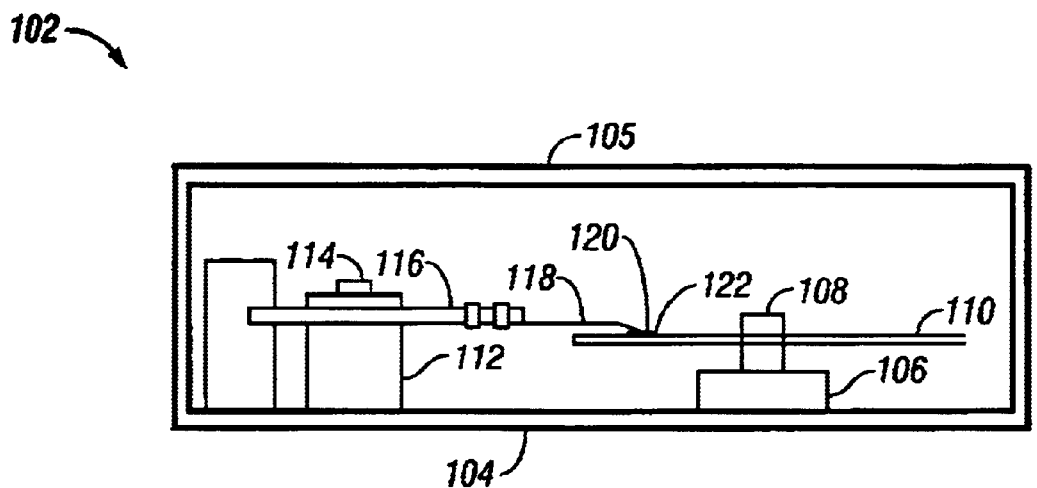
FIG. 18 is a simplified vertical sectional view of a magnetic disk drive that incorporates a write head with a magnetic yoke/pole tip structure made according the present invention.
Figure 19:
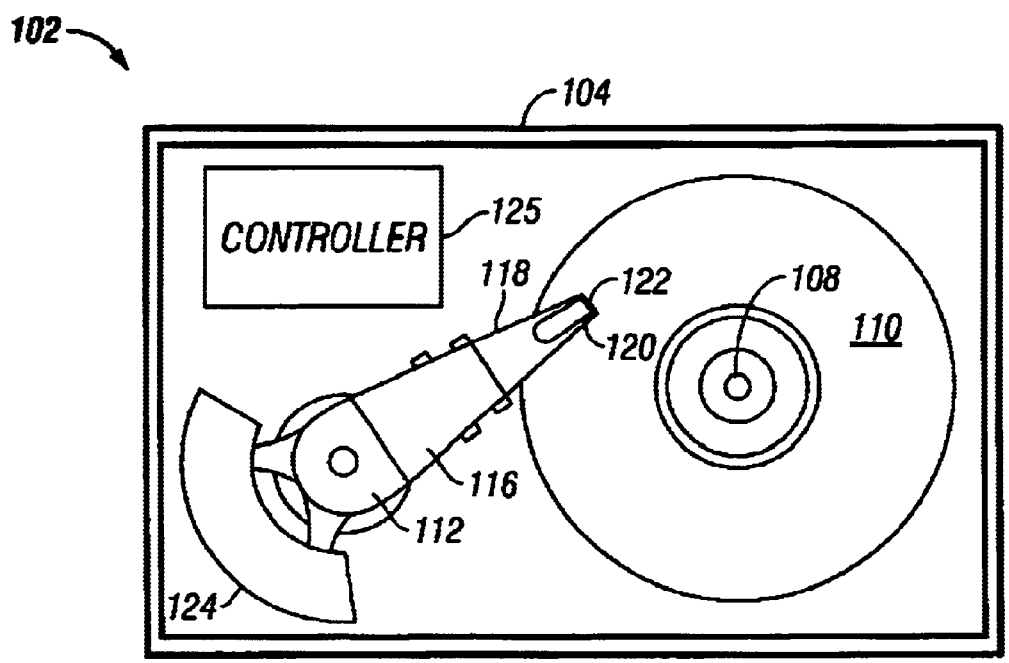
FIG. 19 is a simplified horizontal sectional view of the disk drive of FIG. 18.

The foregoing processes may be used to fabricate soft ferromagnetic films for a variety of applications, including magnetic recording. By way of example, FIGS. 18 and 19 illustrate a disk drive 102 that includes an integrated read/write head comprising a magnetic yoke/pole tip structure in formed in accordance with the invention. The disk drive 102 conventionally includes a base casting 104 made from aluminum or other suitable material. A cover 105 is removably mounted thereto via a hermetic seal (not shown). The base casting 104 supports a conventional spindle drive motor 106 having an associated drive spindle 108. The drive spindle 108 carries a disk 110 for high speed rotation therewith. Other disks (not shown) may also be carried on the drive spindle 108 to form a spaced vertically stacked disk platter arrangement. The disk 110 is from a suitable material of a type usually found in magnetic disk drive assemblies. In particular, the disk 110 is formed from an aluminum or glass substrate with appropriate coatings being applied thereto such that at least one, and preferably both, of the upper and lower surfaces of the disk are magnetically encodable and aerodynamically configured for high speed interaction with a read/write transducer (described below).

Data access to the disk 110 is achieved with the aid of an actuator 112 that is mounted for rotation about a stationary pivot shaft 114. The actuator 112 includes a rigid actuator arm 116 that carries a flexible suspension 118. The suspension 118 in turn carries a slider 120 that mounts a transducer 122. The transducer 122 is an integrated device that includes a magnetic write head and a read head that may incorporate a conventional magnetoresistive sensor or the like. The actuator 112, which is conventionally driven by a voice coil motor 124, moves the slider 120 generally radially across the surface of the disk 110 so that the transducer 122 is able to trace concentric data tracks on the disk.

Data is recorded on the disk 110 by the write head portion of the transducer 122. Data is read from the disk 110 by the read head portion of the transducer 122. This data is processed into a readback signal by signal amplification and processing circuitry (not shown) that is conventionally located on the actuator arm 116. The readback signal, which carries both data and transducer position control information, is sent to the drive controller 125 for conventional processing. The controller 125 also generates write data and position control information during data write operations.

It will be appreciated that the foregoing detailed description of the disk drive 102 and the transducer 122 is exemplary in nature, and that many other design configurations would be possible while still incorporating a write head that has been fabricated according to the invention. For example, although not shown, the disk drive 102 will typically include a large number of disks and the actuator 112 will have several rigid actuator arms 116 carrying plural suspensions 118 and multiple sliders 120, each mounting its own transducer 122. Moreover, instead of using an air bearing slider, an alternative transducer carrying structure may be used that maintains the transducer 122 in contact or near contact with the disk 110.

Figure 20:
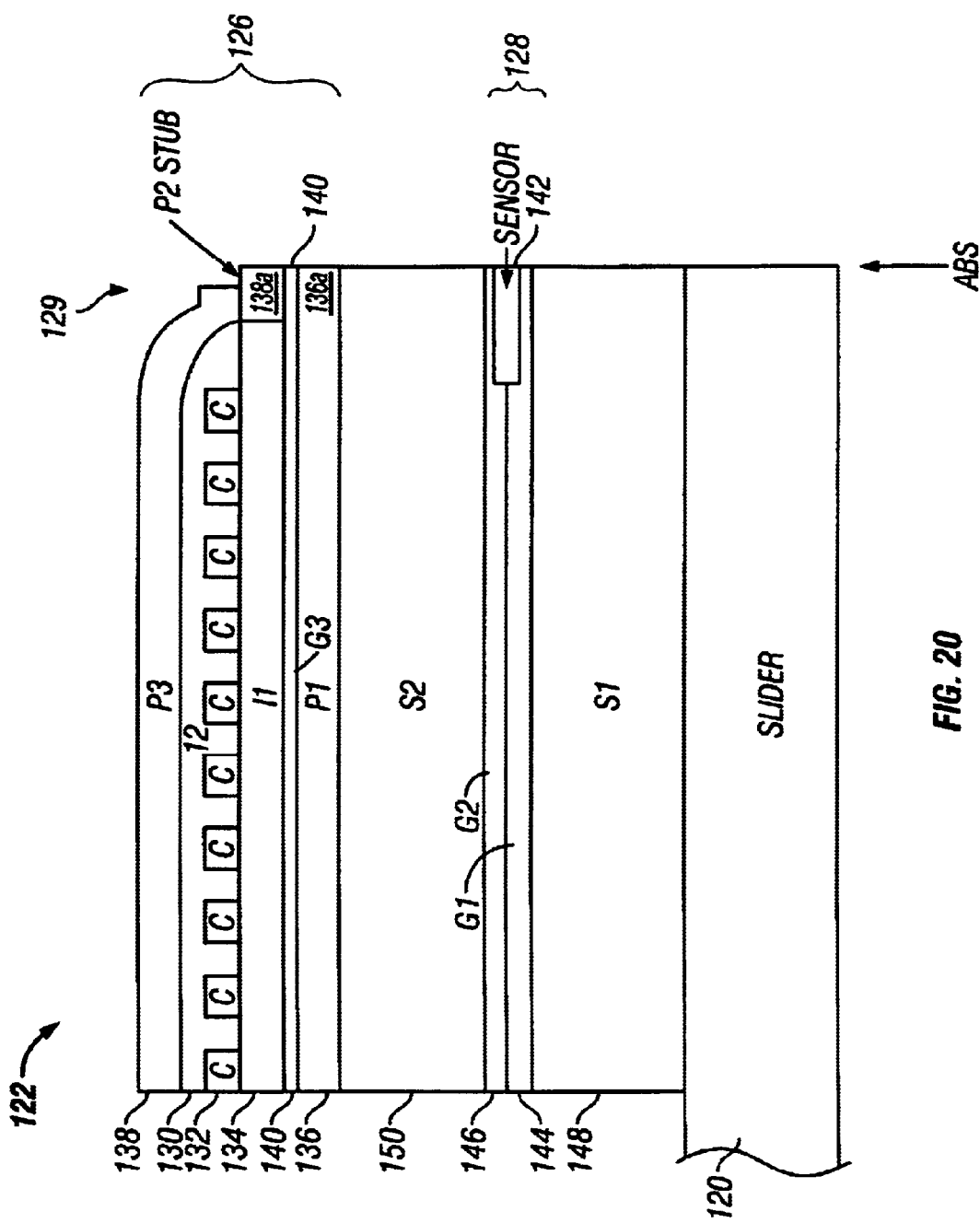
FIG. 20 is a simplified track width centerline sectional view of an integrated read/write head having a magnetic yoke/pole tip structure made in accordance with the invention.
Figure 21:
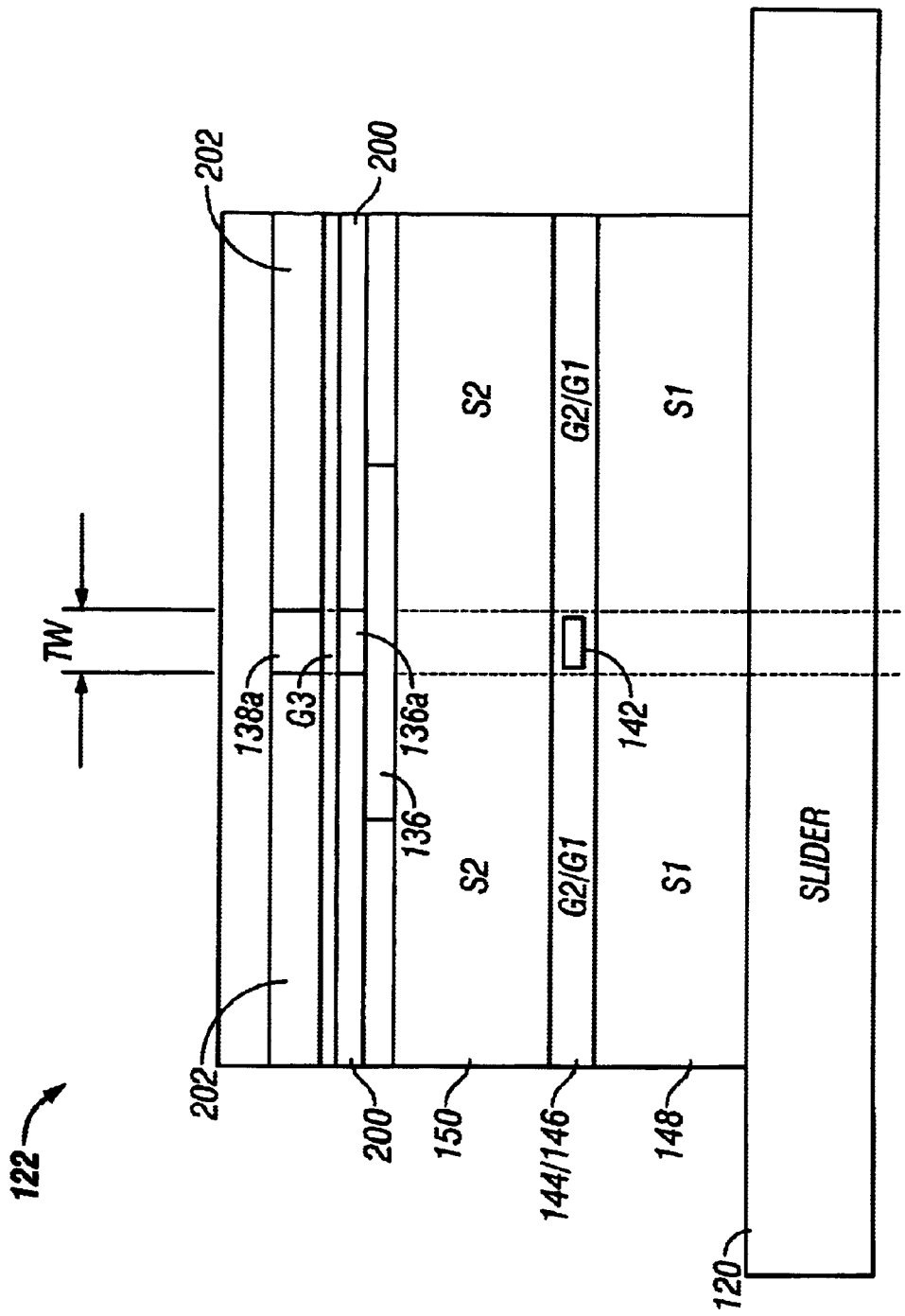
FIG. 21 is an ABS view of the read/write head of FIG. 20.

Turning now to FIGS. 20 and 21, the write head portion of the transducer 122 is shown at 126 and the read head portion is shown at 128. As described in more detail below, the write head 126 comprises magnetic domain-controlled, soft ferromagnetic yoke/pole tip structure made in accordance with the present invention. The transducer 122 is shown in FIG. 20 as being lapped at 129 to form an ABS. The ABS 129 is spaced from the rotating disk 110 during drive operation by virtue of the above-described air bearing. FIG. 21 shows the transducer 122 from the vantage point of the ABS 129.

Figure 1:
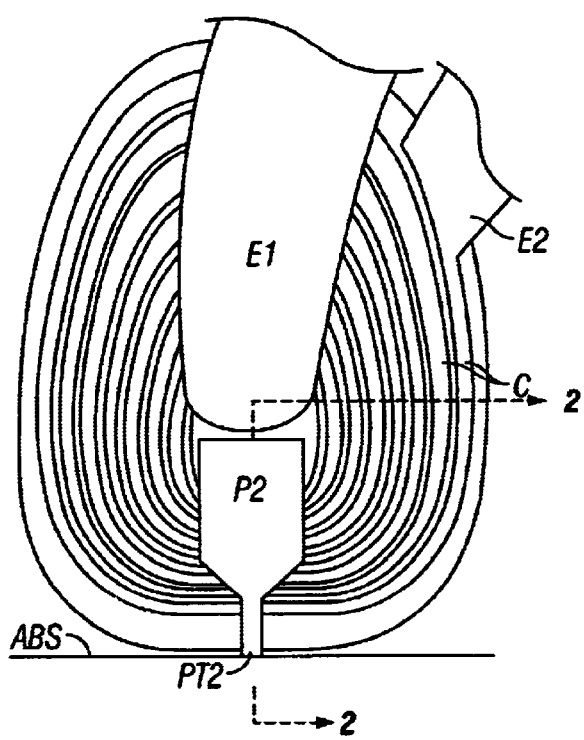
FIG. 1 is a plan view of the inductive write head portion of a conventional integrated read/write head used for magnetic recording applications.
Figure 2:
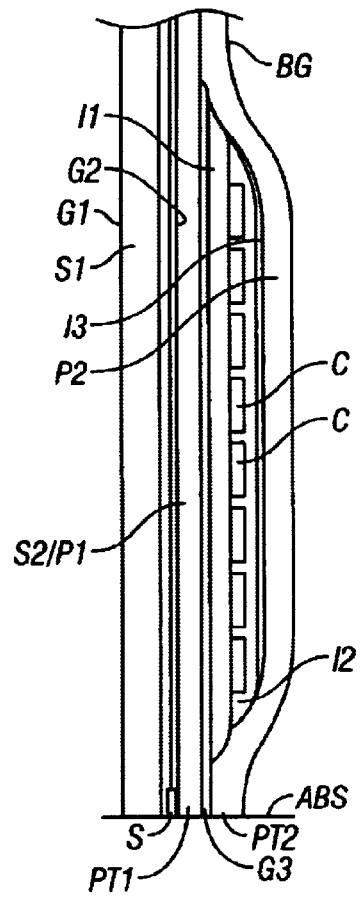
FIG. 2 is a cross-sectional view taken along line 2—2 in FIG. 1.
Figure 3:
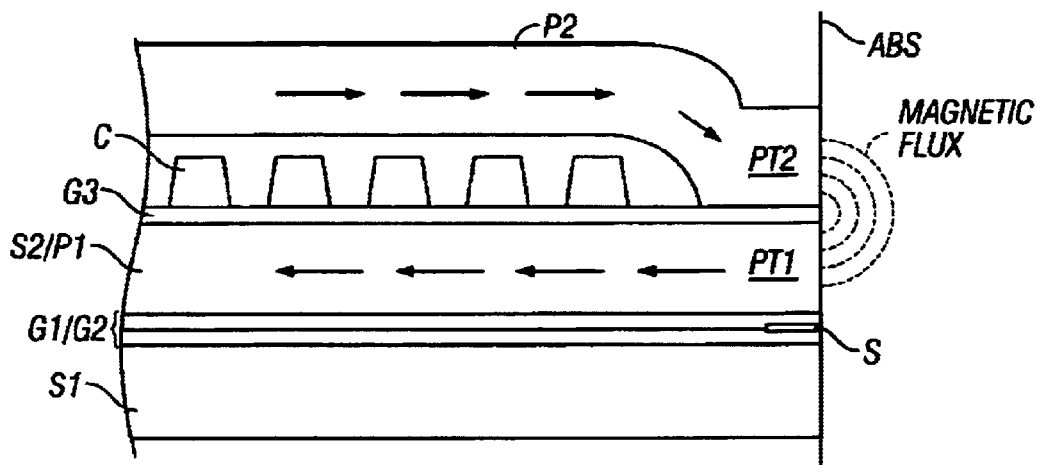
FIG. 3 is a partial enlargement of the cross-sectional view of FIG. 2 to illustrate magnetic flux emanation from the pole tips of the read/write head of FIG. 1.

The write head 126 conventionally includes a combined layer comprising I2 insulative material 130 and plural inductive coil loops 132. The combined insulation and coil layer 130/132 is formed on an I1 insulation layer 134. The coils of the combined layer 130/132 inductively drive first and second pole pieces 136 and 138. A G3 gap layer 140 is sandwiched between the pole pieces 136 and 138 to provide a magnetic write gap at the pole tips 136a and 138a located adjacent to the ABS 129. Note that the pole piece 136 is commonly referred to as a "P1" pole piece and is labeled as such in FIG. 3. The pole piece 138 may either be referred to as a "P2" or "P3" pole piece depending on how the pole tip 138a is formed. If, as shown in FIG. 3, the pole tip 138a is formed separately from the pole piece 138, the pole piece 138 is referred to as a "P3" pole piece (and is labeled as such in FIG. 3) and the pole tip 138a is referred to as a "P2 stub" (as also shown in FIG. 3). If the pole tip 138a is formed with as part of the pole piece 138, the pole piece 138 is referred to as a "P2" pole piece. During a data write operation, signal current is conducted through the coils C of the combined layer 130/132, and flux is induced into the pole pieces 136 and 138. This flux fringes across the pole tips 136a and 138a at the ABS 129 and forms magnetic domains on the rotating disk 110. Note that the back gap portion of the write head 126 is not shown in FIG. 3.

Figure 4:
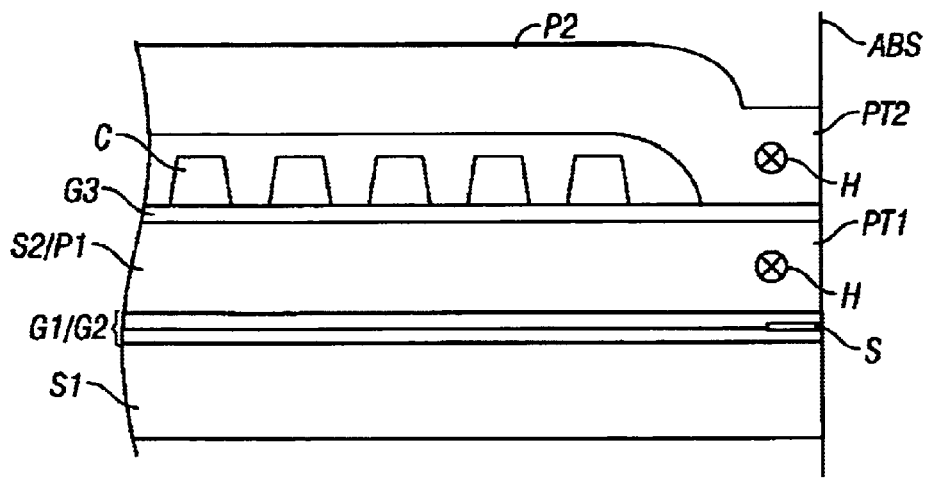
FIG. 4 is another partial enlargement of the cross-sectional view of FIG. 2 to illustrate a technique for aligning the magnetic domains of the pole tips of the read/write head of FIG. 1.
Figure 5A:
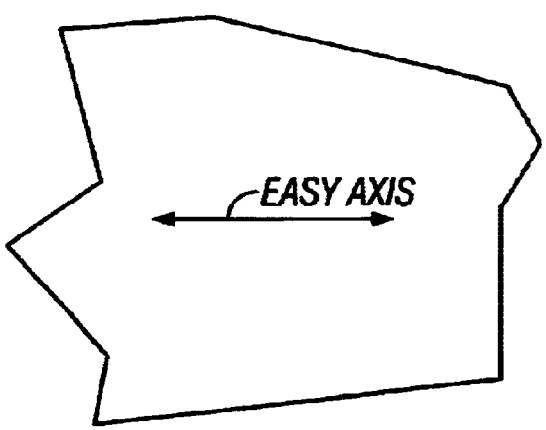
FIG. 5(a) is a diagrammatic plan view representation of easy axis magnetic orientation in a soft ferromagnetic film prior to patterning.
Figure 5B:
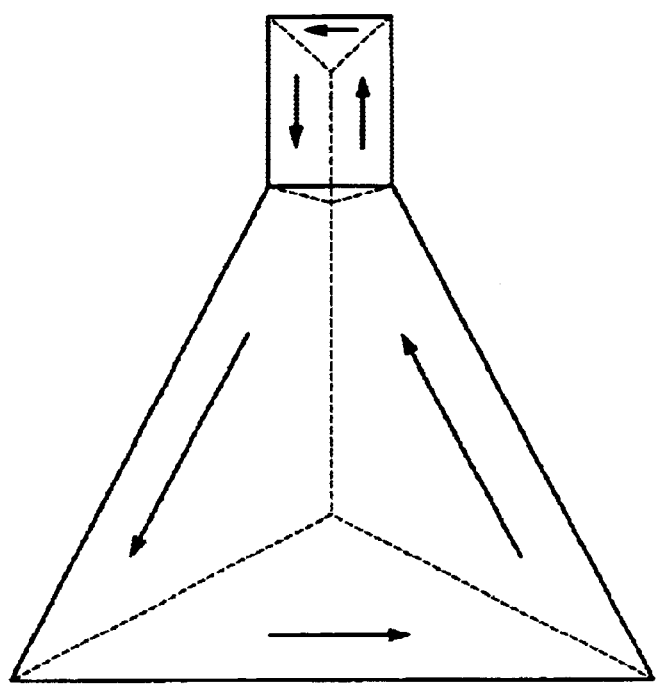
FIG. 5(b) is a diagrammatic plan view representation of the soft ferromagnetic film of FIG. 5(a) following patterning to form a yoke/pole tip structure, and showing the magnetic domain directions therein.
Figure 6A:
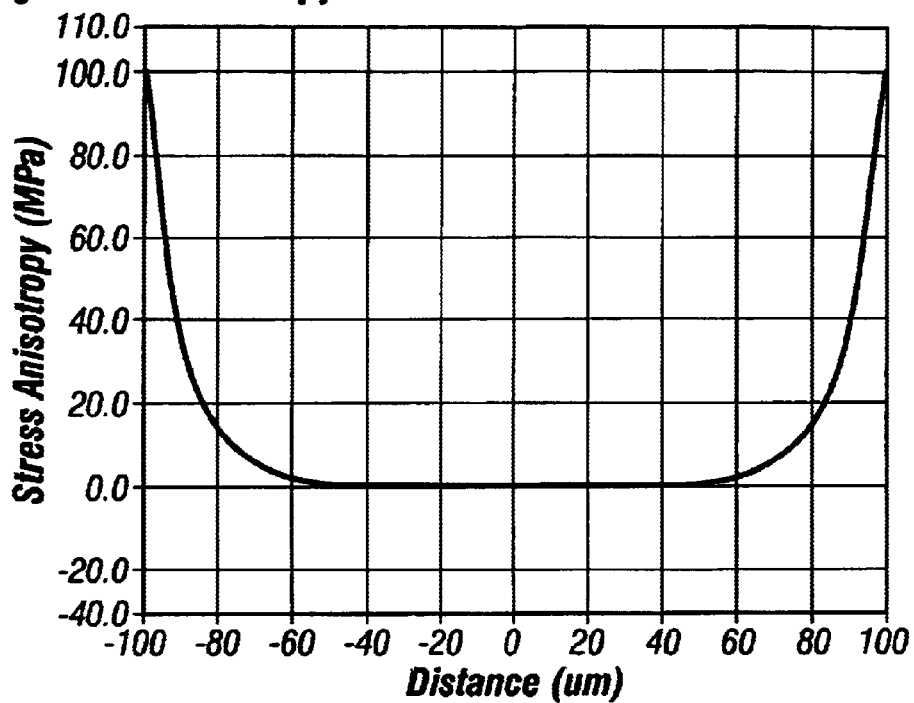
FIG. 6(a) is a graph showing stress anisotropy in a patterned soft ferromagnetic film.
Figure 6B:
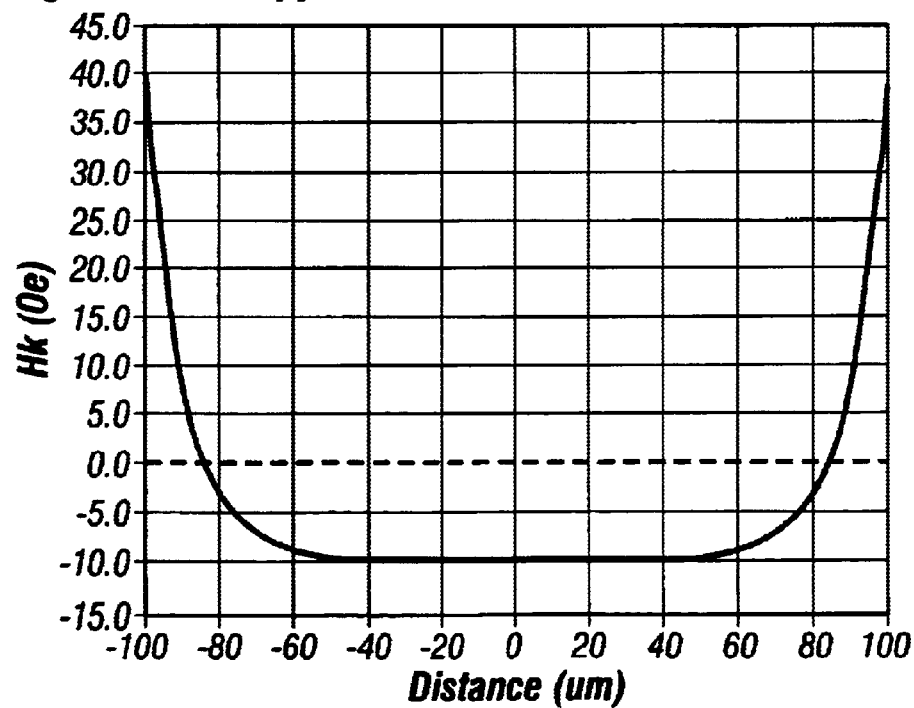
FIG. 6(b) is a graph showing magnetic anisotropy in a patterned soft ferromagnetic film.

FIG. 4 shows the face of the pole tip portions 136a and 138a of the pole pieces 136 and 138. The track width feature size of the pole tips 136a and 138a is defined by the dimension TW in FIG. 4. It will be seen that the pole piece 136 also includes a lower portion that extends beyond the track width dimension TW. This configuration is shown by way of example only and will not necessarily be found in other write heads made in accordance with the invention.

The read head 128 of FIGS. 3 and 4 includes a thin film read sensor 142 disposed in adjacent G1 and G2 gap areas 144 and 146. The G1 and G2 gap areas 144 and 146 are in turn sandwiched between a first (S1) magnetic shield layer 148 and second (S2) magnetic shield layer 150 that in some designs may also be used to provide the pole piece 136. The S1 shield layer 148 is conventionally formed over the slider 20, which is only partially shown in FIGS. 3 and 4 for clarity. During a read operation, magnetized domains on the concentric tracks of the rotating disk 110 inject flux into the read sensor 142. This influences the read sensor 142, causing a corresponding signal to be produced by the read sensor's sensing circuit (not shown).

FIG. 21 illustrates that the construction of the pole pieces 136 and 138 is consistent with the present invention. In particular, it will be seen that the pole tips 136a and 138a are respectively formed between corresponding non-ferromagnetic structures 200 and 202. The pole pieces 136 and 138 are thus magnetic domain-controlled as a result of being stress conditioned by the non-ferromagnetic structures. Note that the width of the non-ferromagnetic structures 200 and 202 is shown arbitrarily, and will not necessarily be as wide as shown in FIG. 21.

Accordingly, method for fabricating a soft ferromagnetic film to control edge stress anisotropy and increase magnetization switching speed has been disclosed. While various embodiments of the invention have been described, it should be apparent that many variations and alternative embodiments could be implemented in accordance with the invention. For example, although several fabrication methods using electroplating, deposition, or a combination thereof are shown and described, the invention is not limited to these methods alone. Indeed, there are no doubt many other approaches that could be used to produce structures of interest according to the invention. It is understood, therefore, that the invention is not to be in any way limited except in accordance with the spirit of the appended claims and their equivalents.

What is claimed is:

1. A magnetic read/write head transducer, comprising:
    a yoke formed from first and second pole pieces extending from a back gap region thereof to a pole tip region and sandwiching an inductive coil;
    said pole pieces each being formed with a magnetic domain-controlled, patterned soft ferromagnetic film structure having enhanced magnetization switching speed;
    non-ferromagnetic film structures formed along patterned edges of said soft ferromagnetic film structures; and
    said non-ferromagnetic film structures being adapted to induce stress contributions in said soft ferromagnetic film structures to control edge stress anisotropy and magnetic domain orientation therein.

2. A transducer in accordance with claim 1 wherein said soft ferromagnetic film structures comprise a transition metal alloy.

3. A transducer in accordance with claim 1 wherein said non-ferromagnetic film structures comprise a material selected from the group consisting of metallic materials and non-metallic materials.

4. A transducer in accordance with claim 1 wherein said non-ferromagnetic film structures are formed to adjust tensile stress generally perpendicularly to patterned edges of said soft ferromagnetic film structures.

5. A transducer in accordance with claim 1 wherein one or both of said soft ferromagnetic film structures and said non-ferromagnetic film structures are electroplated structures.

6. A transducer in accordance with claim 1 wherein one or both of said soft ferromagnetic film structures and said non-ferromagnetic film structures are non-plated deposited structures.

7. A transducer in accordance with claim 1 wherein said soft ferromagnetic film structures comprise a material from the group consisting of alloys of nickel-iron (permalloy), nickel-iron-cobalt alloys, Sendust and cobalt-zirconium-niobium alloys.

8. A transducer in accordance with claim 1 wherein said non-ferromagnetic film structures comprises a material from a first metal group consisting of palladium, copper and nickel-phosphorus alloy or a second non-metal group consisting of oxides of aluminum and oxides of silicon.

9. A transducer in accordance with claim 1 wherein said soft ferromagnetic film structures define the entirety of said pole pieces.

10. A method in accordance with claim 1 wherein said soft ferromagnetic film structures define the pole tips of said pole pieces.

11. A disk drive having a housing, a rotatable magnetic recording medium in the housing, an actuator carrying an actuator arm, a suspension, and a magnetic read/write transducer disposed in adjacent relationship with the recording medium, said transducer comprising:
    a yoke formed from first and second pole piece structures sandwiching an inductive coil;
    said pole piece structures each including a magnetic domain-controlled, patterned soft ferromagnetic film having enhanced magnetization switching speed;
    said pole piece structures each further including non-ferromagnetic material formed along patterned edges of said patterned film; and
    said non-ferromagnetic material being adapted to induce stress contributions in said patterned film to control edge stress anisotropy and magnetic domain orientation therein.

12. A disk drive in accordance with claim 11 wherein said soft ferromagnetic film structures comprise a transition metal alloy.

13. A disk drive in accordance with claim 11 wherein said non-ferromagnetic film structures comprise a material selected from the group consisting of metallic materials and non-metallic materials.

14. A disk drive in accordance with claim 11 wherein said non-ferromagnetic film structures are formed to adjust tensile stress generally perpendicularly to patterned edges of said soft ferromagnetic film structures.

15. A disk drive in accordance with claim 11 wherein one or both of said soft ferromagnetic film structures and said non-ferromagnetic film structures are electroplated structures.

16. A disk drive in accordance with claim 11 wherein one or both of said soft ferromagnetic film structures and said non-ferromagnetic film structures are non-plated deposited structures.

17. A disk drive in accordance with claim 11 wherein said soft ferromagnetic film structures comprise a material from the group consisting of alloys of nickel-iron (permalloy), nickel-iron-cobalt alloys, Sendust and cobalt-zirconium-niobium alloys.

18. A disk drive in accordance with claim 11 wherein said non-ferromagnetic film structures comprises a material from a first metal group consisting of palladium, copper and nickel-phosphorus alloy or a second non-metal group consisting of oxides of aluminum and oxides of silicon.

19. A disk drive in accordance with claim 11 wherein said soft ferromagnetic film structures define the entirety of said pole pieces.

20. A disk drive in accordance with claim 11 wherein said soft ferromagnetic film structures define the pole tips of said pole pieces.

* * * * *